United States Patent [19]
Byers et al.

[11] Patent Number: 5,596,716
[45] Date of Patent: Jan. 21, 1997

[54] METHOD AND APPARATUS FOR INDICATING THE SEVERITY OF A FAULT WITHIN A COMPUTER SYSTEM

[75] Inventors: Larry L. Byers, Apple Valley; Gary R. Robeck, Albertville; Terry J. Brunmeier, Shoreview, all of Minn.

[73] Assignee: Unisys Corporation, Blue Bell, Pa.

[21] Appl. No.: 396,953

[22] Filed: Mar. 1, 1995

[51] Int. Cl.⁶ .......................... G06F 11/08; G06F 11/14
[52] U.S. Cl. ...................... 395/185.01; 395/184.01; 364/241.2; 364/265; 364/266.5; 364/267.7; 364/DIG. 1
[58] Field of Search ........................ 395/575, 500, 395/650, 725, 185.01, 183.2, 182.03, 184.01, 40.4, 51.1; 371/8.2, 11.3, 12, 16.1, 19; 364/285, 241.2, 266.5, 267.7, 265

[56] References Cited

U.S. PATENT DOCUMENTS

| | | | |
|---|---|---|---|
| 4,058,851 | 11/1977 | Scheuneman | 364/900 |
| 4,092,713 | 5/1978 | Scheuneman | 364/200 |
| 4,112,502 | 9/1978 | Scheuneman | 364/900 |
| 4,139,148 | 2/1979 | Scheuneman et al. | 235/312 |
| 4,163,147 | 7/1979 | Scheuneman et al. | 235/312 |
| 4,531,213 | 7/1985 | Scheuneman | 371/3 |
| 4,539,682 | 9/1985 | Herman et al. | 371/15.1 |
| 4,649,475 | 3/1987 | Scheuneman | 364/200 |
| 4,757,440 | 7/1988 | Scheuneman | 364/200 |
| 4,817,092 | 3/1989 | Denny | 371/11.3 |
| 4,873,687 | 10/1989 | Breu | 371/8.2 |
| 4,881,230 | 11/1989 | Clark et al. | 371/20.1 |
| 4,914,657 | 4/1990 | Walter et al. | 371/11.3 |
| 4,918,695 | 4/1990 | Scheuneman et al. | 371/51.1 |
| 4,918,696 | 4/1990 | Purdham et al. | 371/57.1 |
| 4,926,426 | 5/1990 | Scheuneman et al. | 371/40.1 |
| 4,962,501 | 10/1990 | Byers et al. | 371/51.1 |
| 4,974,147 | 11/1990 | Hanrahan et al. | 364/242.6 |
| 4,996,688 | 2/1991 | Byers et al. | 371/16.5 |
| 5,390,324 | 2/1995 | Burckhartt et al. | 395/575 |

*Primary Examiner*—Robert W. Beausoliel, Jr.
*Assistant Examiner*—Dieu-Minh Le
*Attorney, Agent, or Firm*—Nawrocki, Rooney & Sivertson, P.A.

[57] ABSTRACT

A method and apparatus for efficiently identifying and indicating the severity of the fault within a computer system. In an exemplary embodiment of the present invention, the circuitry of a computer system may be divided into a number of groups. Each group may contain circuitry which may result in the same fault type. For example, predetermined circuitry which, when a fault is detected therein, may have a minimal affect on the normal operation of the computer system may be provided in a first group. Similarly, predetermined circuitry which, when a fault is detected therein, may have an immediate affect on the normal operation of the computer system may be provided in a second group. Each group may provide an error priority signal to a support controller. The support controller may interpret the number of error priority signals provided by the number of groups and may determine the appropriate time to take corrective action thereon.

48 Claims, 18 Drawing Sheets

| SIGNAL | SIGNAL DESCRIPTION |
|---|---|
| D(0-31) | DSD DATA BUS (I.O.Z) - BI-DIRECTIONAL MAIN DATA PATH FOR ALL OPERATIONS - ASSERTED BY BUS MASTER FOR WRITE OPERATIONS AND BY BUS SLAVE FOR READ OPERATIONS |
| DP(0-3) | DSD DATA BUS PARITY (I.O.Z) - DP0 = PARITY FOR D0-7. DP1 = PARITY FOR D8-15. DP2 = PARITY FOR D16-23. DP3 = PARITY FOR D24-31. |
| A(0-29) | DSD ADDRESS BUS (I.O.Z) - BI-DIRECTIONAL ADDRESS BUS FOR ALL DEVICES ATTACHED TO THE INTERFACE - ASSERTED BY THE BUS MASTER. |
| ADS/ | ADDRESS STATUS (I.O.Z) - WHEN ASSERTED BY THE BUS MASTER. THE CONTENTS OF THE ADDRESS BUS ARE VALID - DEFINES THE START OF A BUS CYCLE |
| W-R/ | WRITE/READ (I.O.Z) - INDICATES THE DIRECTION OF DATA TRANSFER RELATIVE TO THE BUS MASTER - DRIVEN BY THE BUS MASTER. WRITE=1. READ=0. |
| HOLD/ | HOLD (O) - ASSERTED BY DEVICE TO INDICATE THAT IT IS REQUESTING BUS MASTERSHIP |
| HLDAI/ | HOLD ACKNOWLEDGE (I) -ASSERTED BY BUS ARBITRATION LOGIC TO INDICATE THAT THE PREVIOUS BUS MASTER HAS RELINQUISHED USE OF THE BUS. |
| BCLK | BUS CLOCK (I) - CLOCK SIGNAL THAT CONTROLS THE DMA PORTION OF THE NCR53C720 |
| RESET/ | CHIP RESET (I) - FORCES A SYNCHRONOUS FULL CHIP RESET OF THE NCR53C720 - MUST BE ASSERTED FOR A MINIMUM OF 15 BUS CYCLES |
| CS/ | CHIP SELECT (I) - SELECTS THE NCR53C720 AS A SLAVE DEVICE - CONNECTED TO ADDRESS BIT 6 IN THE DSD APPLICATION |
| IRQ/ | INTERRUPT (O) - INDICATES THAT SERVICE IS REQUIRED FROM THE USBC |

FIG. 10A

| SIGNAL | SIGNAL DESCRIPTION |
|---|---|
| BE3/ | BYTE ENABLE THREE (I.O.Z) - ENABLES DATA TRANSFER ON DATA BUS LINES D0-D7 - ASSERTED BY BUS MASTER |
| BE2/ | BYTE ENABLE TWO (I.O.Z) - ENABLES DATA TRANSFER ON DATA BUS LINES D8-D15 - ASSERTED BY BUS MASTER |
| BE1/ | BYTE ENABLE ONE (I.O.Z) - ENABLES DATA TRANSFER ON DATA BUS LINES D16-D23 - ASSERTED BY BUS MASTER |
| BE0/ | BYTE ENABLE ZERO (I.O.Z) - ENABLES DATA TRANSFER ON DATA BUS LINES D24-D31 - ASSERTED BY BUS MASTER |
| READYI/ | READY-IN (I) - SIGNAL FROM SLAVE DEVICE TO BUS MASTER INDICATING THAT SLAVE IS READY TO TRANSFER DATA |
| READYO/ | READY-OUT (O) - ASSERTED TO INDICATE THE END OF A SLAVE MODE CYCLE - THE NCR53C720 PROVIDES THIS SIGNAL TO TERMINATE A SLAVE CYCLE |
| MASTER/ | MASTER STATUS (O) - ASSERTED BY THE NCR53C720 WHEN IT BECOMES THE MASTER |
| BS(2-0) | BUS MODE SELECT (I) - SELECTS THE BUS MODE (MOTOROLA OR INTEL) AND ADDRESSING MODE (BIT OR LITTLE ENDIAN) - IN THE DSD APPLICATION, BS(2-0) = "010" THEREBY SELECTING 80386DX LIKE (BUS MODE 4) AND BIG ENDIAN BUS MODE. |
| AUTO/ | SCRIPTS AUTOSTART MODE (I) - SELECTS EITHER AUTO OR MANUAL SCRIPTS START MODE. WHEN AUTO/=0, SCRIPTS STARTS AT ADDRESS-0 (ADDRESS IN DSP REGISTER OF NCR DEVICE) AUTOMATICALLY FOLLOWING A CHIP RESET. WHEN AUTO/=1, SCRIPTS STARTS AFTER THE DSP REGISTER HAS BEEN LOADED BY THE USBC. IN THE DSD APPLICATION, AUTO/ IS SET TO 1. |

FIG. 10B

METHOD AND APPARATUS FOR INDICATING THE SEVERITY OF A FAULT WITHIN A COMPUTER SYSTEM

CROSS REFERENCE TO CO-PENDING APPLICATIONS

The present application is related to U.S. patent application Ser. No. 08/396,951, filed Mar. 1, 1995, entitled "Method and Apparatus For Storing Computer Data After a Power Failure", which is assigned to the assignee of the present invention and is incorporated herein by reference.

BACKGROUND OF THE INVENTION

1. Field of the Invention

The present invention generally relates to general purpose digital data processing systems and more particularly relates to such systems which provide fault detection therein.

2. Description of the Prior Art

A key design element of high reliability computer systems is that of error detection and correction. It has long been recognized that the integrity of the data bits within the computer system is critical to ensure the accuracy of operations performed in the data processing system. The alteration of a single data bit in a data word can dramatically affect arithmetic calculations or can change the meaning of a data word as interpreted by other sub-systems within the computer system.

One method for performing error detection is to associate an additional bit, called a "parity bit", along with the binary bits comprising a data word. The data word may comprise data, an instruction, an address, etc. Parity involves summing without carry the bits representing a "one" within a data word and providing an additional "parity bit" so that the total number of "ones" across the data word, including the added parity bit, is either odd or even. The term "Even Parity" refers to a parity mechanism which provides an even number of ones across the data word including the parity bit. Similarly, the term "Odd Parity" refers to a parity mechanism which provides an odd number of ones across the data word including the parity bit.

A typical system which uses parity as an error detection mechanism has a parity generation circuit for generating the parity bit. For example, when the system stores a data word into a memory, the parity generation circuit generates a parity bit-from the data word and the system stores both the data word and the corresponding parity bit into an address location in the memory. When the system reads the address location where the data word is stored, both the data word and the corresponding parity bit are read from the memory. The parity generation circuit then regenerates the parity bit from the data bits read from the memory device and compares the regenerated parity bit with the parity bit that is stored in memory. If the regenerated parity bit and the original parity bit do not compare, an error is detected and the system is notified.

It is readily known that a single parity bit in conjunction with a multiple bit data word can detect a single bit error within the data word. However, it is also readily known that a single parity bit in conjunction with a multiple bit data word can be defeated by multiple errors within the data word. As calculation rates increase, circuit sizes decrease, and voltage levels of internal signals decrease, the likelihood of multiple errors within a data word increase. Therefore, methods to detect multiple errors within a data word are essential. In response thereto, system designers have developed methods for detecting multiple errors within multiple bit data words by providing multiple parity bits for each multiple bit data word.

The above referenced error detection schemes may be used on a number of internal nodes within a computer system. However, because additional hardware must be provided for each node protected by the error detection scheme, it may not be practical to provide error detection to a large number of internal nodes within the computer system. That is, the additional cost and power required to provide error detection to a large number of internal nodes of a computer system may be prohibitive.

To combat this limitation, a number of critical nodes within a computer system may be provided with the above referenced error detection schemes. The critical nodes may provide a mechanism for detecting if an error exists within the computer system. However, because the percentage of nodes that typically are provided with an error detection capability may be relatively low when compared to the total number of nodes within the computer system, the actual hardware source of the error may not be isolated with any certainty using this technique.

In a typical prior art system, the system may have a number of circuit boards. Each circuit board may have a number of integrated circuit devices. Each integrated circuit device may have an error register therein. A number of error detection units may be provided on a number of critical nodes within each integrated circuit, as described above. Each of the number of error detection units may assert an error bit within the corresponding error register when an error is detected. That is, the error register may have a number of bits wherein each bit may correspond to one or more error detection unit. After an error is detected, the corresponding integrated circuit device may freeze the state of the corresponding error detection register. Freezing the state of the error detection register may allow the system to perform accurate error analysis later. The corresponding error register may then assert an error bit within a board level error register. The board level error register may have an error bit for each integrated circuit device located on the board. The corresponding board may then freeze the state of the board level error register and provide an error signal to a support controller.

Using this architecture, the support controller may read the contents of the board level error register and determine which of the integrated circuits may have caused the error. Thereafter, the support controller may read the error register in the corresponding integrated circuit device to determine what portion of the integrated circuit may have caused the error.

In the above described system, a hierarchical approach is used to help isolate the portion of the circuitry which may have caused the error. However, this approach may only isolate an error to a particular error detection unit. That is, the hierarchical approach may have the same limitations as described above with reference to-the error detection schemes. Namely, because additional hardware must be provided for each node protected by the error detection scheme, it may not be practical to provide error detection to a large number of internal nodes within the computer system. That is, the additional cost and power required to provide error detection to a large number of internal nodes of a computer system may be prohibitive. Because the percentage of nodes that typically are provided with an error detection capability may be relatively low when compared to the total number of nodes within the computer system, the actual hardware source of the error may not be isolated with any certainty.

One way to further isolate the source of the error is to use built-in-self-test (BIST) techniques. It is known that the complexity of computer systems has increased exponentially over the past several decades. Because of this increased complexity, many of the internal nodes within modern computer systems are not controllable or observable from the external I/O pins. BIST design techniques have been developed to combat this growing problem. BIST can be used to make the internal nodes of a complex computer system both controllable and observable and therefore testable. This is the only method of ensuring hardware integrity in many modern computer systems.

One method for providing BIST is to replace the functional registers within a design with serial scan shift registers. The serial scan shift registers can operate in both a functional mode and a test mode. During normal operations, the serial scan shift registers are placed in functional mode and operate like any other flip-flop. In test mode, the serial scan shift registers are configured into a scan path which allows test data to be "serially shifted" through the registers within the design. Typically, a support controller scans in computer generated serial scan test vectors through the serial scan shift registers within the design. Once these vectors are fully shifted into the design, the data residing in the serial scan shift registers then travels through the logic gates and eventually arrives at either an I/O pin or another serial scan shift register. The serial scan shift registers are then switched into functional mode and the clock is pulsed once. The functional clock causes the serial scan shift registers to capture the data that has traveled through the logic gates. The serial scan shift registers are then switched back into test mode and the results are shifted out and compared to an expected value. This process may be repeated until the source of an error is identified.

A technique that may be used for automating the latter part of this process is to provide a signature analysis register within the design. The signature analysis register is coupled to predetermined nodes within the design. As a predefined pattern is shifted through the design, the signature analysis register is updated periodically. At the end of the test, the contents of the signature analysis register are compared to an expected "signature". If there is a match, the system is deemed to be fully functional. This eliminates the need to compare the results of the serial scan vectors with an expected result and therefore may reduce the complexity of the support controller. However, the signature analysis approach described above typically only provides a pass or fail result and generally does not identify the faulty hardware element. This is a drawback of the signature analysis approach.

Modern computer systems may utilize the above referenced error detection techniques on a number of critical nodes to identify when an error exist therein. A support controller or the like may then be notified of the error wherein BIST techniques may then be used to isolate the source of the error. As indicated above, the signature analysis approach is generally not used to isolate the source of the error. Rather, a support controller may shift test vectors through a corresponding scan path as described above.

A limitation of the above referenced BIST approach is that the corresponding computer system, or at least a portion thereof, must be taken out of functional mode and placed in a test mode. This may require the computer system to be interrupted during the execution of a transaction. In some high reliability computing applications, this may not be acceptable. For example, in the banking industry, high reliability computer systems may be used to process a large number of banking transactions. It may not be acceptable to interrupt the banking computer system whenever a fault is detected, unless the fault is a critical fault which could corrupt a corresponding data base. As can readily be seen, an interruption of the banking computer may cause a transaction to be lost. Similarly, in the airline industry, high reliability computer systems may be used to process a large number of seat reservations. It may not be acceptable to interrupt the airline reservation computer system whenever a fault is detected, unless the fault is a critical fault which could corrupt a corresponding data base. As can readily be seen, an interruption of the airline reservation computer may cause a seat assignment to be lost, thereby allowing a single seat to be assigned to multiple passengers or the like.

SUMMARY OF THE INVENTION

The present invention overcomes many of the disadvantages of the prior art by providing a method and apparatus for identifying and indicating the severity of the fault within a computer system. In a typical computer system, each fault therein may have an affect on the operation of the computer system. For example, a fault detected in a non-essential portion of the computer system may not have an immediate affect on the normal operation of the computer system. A non-essential portion of the computer system may include redundant circuitry, test circuitry, error detection circuitry, initialization circuitry, performance monitoring circuitry, etc. However, a detected fault in an essential portion of the computer system may have an affect on the normal operation of the computer system including the corruption of a corresponding data base.

As indicated above, in some high reliability computing applications, an interruption of the normal operation of a computer system may not be acceptable. For example, in the banking industry, high reliability computer systems may be used to process a large number of banking transactions. It may not be acceptable to interrupt the banking computer system whenever a fault is detected, unless the fault is a critical fault which could corrupt a corresponding data base. As can readily be seen, an interruption of the banking computer may cause a transaction to be lost. Similarly, in the airline industry, high reliability computer systems may be used to process a large number of seat reservations. It may not be acceptable to interrupt the airline reservation computer system whenever a fault is detected, unless the fault is a critical fault which could corrupt a corresponding data base. As can readily be seen, an interruption of the airline reservation computer may cause a seat assignment to be lost, thereby allowing a single seat to be assigned to multiple passengers or the like.

For these and other reasons, it may be important to allow the normal operation of the computer system to continue, despite the detection of an fault within the computer system. That is, if an error is deemed to be passive, thereby not affecting the normal operation of the computer system, the normal operation of the computer system may be allowed to continue. However, if an error is deemed to be critical, thereby affecting the normal operation of the computer system, the normal operation of the computer system may be interrupted and the fault may be serviced.

It is contemplated that a wide variety of fault types may occur within a computer system. Each of the fault types may have a different affect on the operation of the computer system. In response thereto, it is contemplated that each of the variety of fault types may be handled in a different manner by the computer system. For example, a first fault type may have a minimal affect on the operation of the computer system. An example of a first fault type may be a faulty address location within a memory. The faulty address location may be tagged as faulty and a corresponding processor or the like be notified to not use the tagged address location. In this situation, the faulty address location may have a minimal affect on the operation of the computer system. The first fault types may provide an error priority signal to a support controller indicating that the support controller should notify a service technician that the faulty memory needs to be serviced during the next preventive maintenance session. A second fault type may be deemed more critical than the first fault type, but still may have a minimal affect on the operation of the computer system. An example of a second fault type may be a fault detected in a redundant hardware element. The redundant hardware element may not affect the normal operation of the computer system but may affect the reliability thereof. The second fault type may provide an error priority signal to a support controller indicating that the support controller should analyze the error during the next reboot of the computer system. A third fault type may be deemed more critical than the second fault type, but still may not affect the normal operation of the computer system. An example of a third fault type may be a fault detected in an I/O port which is currently not in use. The third fault type may provide an error priority signal to the support controller indicating that the support controller should analyze the error when time permits. That is, the support controller may analyze the error when the utilization of the affected hardware drops below a predetermined level. A fourth fault type may be deemed more critical than the third fault type, but still may not affect the normal operation of the computer system. For example, the current instruction of the computer system may not utilize a particular hardware element within the computer system. However, the next instruction may utilize the particular hardware element. The fourth fault type may provide an error priority signal to the support controller indicating that the support controller should analyze the error after the current instruction is completed. Finally, a fifth fault type may be deemed more critical than the fourth fault type, and may affect the normal operation of the computer system. For example, a fault may be detected on a bus which is being used by the current instruction. The bus fault may affect the normal operation of the computer system, and may even corrupt a corresponding data base. The fifth fault type may provide an error priority signal to the support controller indicating that the support controller should interrupt the normal operation of the computer system, and analyze the error immediately.

It is recognized that the above referenced five fault types are only exemplary. It is contemplated that any number of fault types may be identified and used and still be within the scope of the present invention.

In an exemplary embodiment of the present invention, the circuitry of a computer system may be divided into a number of groups. Each group may contain circuitry which may result in the same fault type. For example, predetermined circuitry which, when a fault is detected therein, may have a minimal affect on the normal operation of the computer system may be provided in a first group. Similarly, predetermined circuitry which, when a fault is detected therein, may have an immediate affect on the normal operation of the computer system may be provided in a second group. Each group may provide an error priority signal to a support controller. The support controller may interpret the number of error priority signals provided by the number of groups and may determine the appropriate time to take corrective action thereon.

In another exemplary embodiment of the present invention, the present invention may be used in conjunction with a system wherein data within a non-volatile memory element may be downloaded to a disk drive under battery power when a primary power source fails. The system may have a host interface adapter and a non-volatile memory element. The host interface adapter (HIA) may have a data save disk controller (DSDC) application specific integrated circuit (ASIC), a disk controller, and a number of disk drives. The host interface adapter may provide an interface between the host main storage and the non-volatile memory element. The host interface adapter may further provide an interface between the non-volatile memory element and the DSDC ASIC wherein the DSDC ASIC may download and/or upload the contents of the non-volatile memory element to/from the disk controller and disk drives when the primary power source fails.

In some smaller system configurations, the battery backup source may provide enough power to download all of the contents of the non-volatile memory element through an I/O processor and to a host disk storage system. In these systems, the data save disk (DSD) function may be redundant. In some larger system configurations, however, the data save disk function may be considered critical because the battery backup power source may not provide enough power to download all of the data elements in the non-volatile memory element through the I/O processor and to the host disk storage system. That is, the battery backup power source may only provide enough power to download all of the data elements in non-volatile memory element through the DSDC ASIC and to the number of disk drives.

The DSDC ASIC may support both host interface adapter functions and data save disk functions. In the smaller system configurations discussed above, the data save disk function may be redundant. Therefore, in accordance with the present invention, the portion of the DSDC ASIC which supports the HIA functions may be in a first fault group while the portion of the DSDC ASIC which supports the data save disk function may be in a second fault group. An error detected in the first fault group may be considered "critical" because the normal operation of the computer system may be affected. However, an error detected in the second fault group may be considered "passive" because the DSD function is considered redundant and therefore the normal operation of the computer system may not be affected.

Each of the two groups may have an error detection scheme provided therein. Further, each of the two groups may have a number of scan paths provided therein to support BIST operations. The first group may provide an error signal to a support controller when an error is detected therein. In response thereto, the support controller may interrupt the normal operation of the computer system and analyze the error immediately. Further, the source of the error may be identified using BIST techniques, as described above. The second group may also provide an error signal to the support controller when an error is detected therein. In response thereto, the support controller may not interrupt the normal operation of the computer system, but rather may set a degrade bit on the host interface card to indicate that the DSD function is no longer available. The host interface adapter card may then be replaced at some future date with minimal system impact. As can readily be seen, the present invention may allow the normal operation of the computer system to continue despite the detection of an error within the second group. This may increase the overall reliability and performance of the corresponding computer system.

In another exemplary embodiment, the larger systems discussed above may have a redundant host interface adapter. A fault detected in the redundant host interface adapter may be deemed passive since the fault may not impact the current operation of the computer system.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIGS. 10A–10B comprise a table illustrating an exemplary bus description of the DSD bus of FIG. 8;

DETAILED DESCRIPTION OF THE PREFERRED EMBODIMENTS

Figure 1:
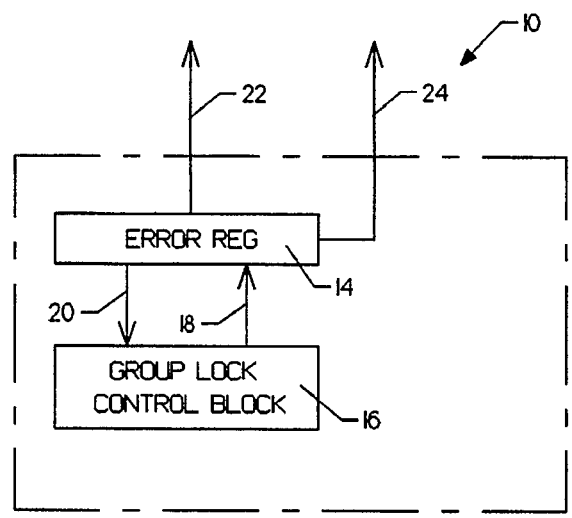
FIG. 1 is a block diagram showing a typical error reporting scheme within a computer system.

FIG. 1 is a block diagram showing a typical error reporting scheme within a computer system. The diagram is generally shown at 10. A typical computer system 12 may have an error reporting scheme provide therein. The error reporting scheme may consist of an error detection register 14 and a group lock control block 16. A number of error detection units (not shown) may be provided on a number of critical nodes within the system, as described above. Each of the number of error detection units may assert an error bit within the corresponding error detection register 14 when an error is detected. That is, error detection register 14 may have a number of bits wherein each bit may correspond to one or more error detection units (see FIG. 2). Thereafter, error detection register 14 may indicate to group lock control block 16 that an error has been detected via interface 20. Group lock control block 16 may freeze the state of error detection register 14 when an error is detected via interface 18. Freezing the state of error detection register 14 may allow the system to perform accurate error analysis. That is, error detection register 14 may indicate an error to a support controller (not shown) via interface 22 wherein the support controller may then scan out the contents of error detection register 14 via interface 24 and analyze the errors indicated therein.

Using this architecture, the support controller may read the contents of error detection register 14 and determine what portion of the system may have caused the error. However, this approach may only isolate an error to a particular error detection unit. That is, this approach may have the same limitations as described above with reference to the error detection schemes. Namely, because additional hardware must be provided for each node protected by the error detection scheme, it may not be practical to provide error detection to a large number of internal nodes within the computer system. That is, the additional cost and power required to provide error detection to a large number of internal nodes of a computer system may be prohibitive. Because the percentage of nodes that typically are provided with an error detection capability may be relatively low when compared to the total number of nodes within the computer system, the actual hardware source of the error may not be isolated with any certainty.

One way to further isolate the source of the error is to use built-in-self-test (BIST) techniques. It is known that the complexity of computer systems has increased exponentially over the past several decades. Because of this increased complexity, many of the internal nodes within modern computer systems are not controllable or observable from the external I/O pins. BIST design techniques have been developed to combat this growing problem. BIST can be used to make the internal nodes of a complex computer system both controllable and observable and therefore testable. This is the only method of ensuring hardware integrity in many modern computer systems.

One method for providing BIST is to replace the functional registers within a design with serial scan shift registers. The serial scan shift registers can operate in both a functional mode and a test mode. During normal operations, the serial scan shift registers are placed in functional mode and operate like any other flip-flop. In test mode, the serial scan shift registers are configured into a scan path which allows test data to be "serially shifted" through the registers within the design. Typically, a support controller scans in computer generated serial scan test vectors through the serial scan shift registers within the design. Once these vectors are fully shifted into the design, the data residing in the serial scan shift registers then travels through the logic gates and eventually arrives at either an I/O pin or another serial scan shift register. The serial scan shift registers are then switched into functional mode and the clock is pulsed once. The functional clock causes the serial scan shift registers to capture the data that has traveled through the logic gates. The serial scan shift registers are then switched back into test mode and the results are shifted out and compared to an expected value. This process may be repeated until the source of an error is identified.

Modern computer systems may utilize the above referenced error detection techniques on a number of critical nodes to identify when an error exist therein. A support controller or the like may then be notified of the error wherein BIST techniques may then be used to isolate the source of the error.

A limitation of the above referenced approach is that the corresponding computer system, or at least a portion thereof, must be taken out of functional mode and placed in a test mode. This may require the computer system to be interrupted during the execution of a transaction. In some high reliability computing applications, this may not be acceptable. For example, in the banking industry, high reliability computer systems may be used to process a large number of banking transactions. It may not be acceptable to interrupt the banking computer system whenever a fault is detected, unless the fault is a critical fault which could corrupt a corresponding data base. As can readily be seen, an interruption of the banking computer may cause a transaction to be lost. Similarly, in the airline industry, high reliability computer systems may be used to process a large number of seat reservations. It may not be acceptable to interrupt the airline reservation computer system whenever a fault is detected, unless the fault is a critical fault which could corrupt a corresponding data base. As can readily be seen, an interruption of the airline reservation computer may cause a seat assignment to be lost, thereby allowing a single seat to be assigned to multiple passengers or the like.

Figure 2:
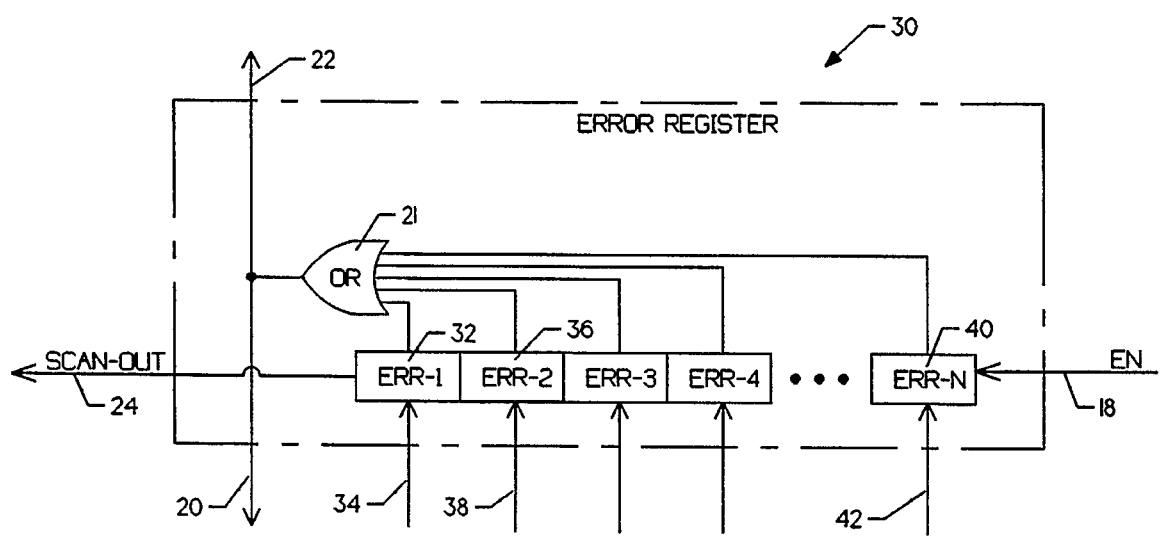
FIG. 2 is a block diagram detailing the error register of FIG. 1.

FIG. 2 is a block diagram detailing the error detection register of FIG. 1. The diagram is generally shown at 30. Error detection register 14 may consist of a number of error bits wherein each bit may be coupled to one or more error detection circuits within the computer system. For example, error detection register 14 may have a first error bit 32, a second error bit 36, and an Nth error bit 40. First error bit 32 may be coupled to a first error detection circuit via interface 34. Second error bit 36 may be coupled to a second error detection circuit via interface 38. Finally, Nth error bit 40 may be coupled to a Nth error detection circuit via interface 42.

An output of each error bit may be provided to an OR-gate 21 or equivalent as shown. Or-gate 21 may indicate that an error has been detected to group lock control block 16 via interface 20. In response thereto, group lock control block 16 may disable error detection register 14 via interface 18. This may freeze the contents of error detection register 14. As indicated above, freezing the state of error detection register 14 may allow the system to perform accurate error analysis thereon. Or-gate 21 may further indicate an error to a support controller via interface 22 wherein the support controller may scan out the contents of error detection register 14 via interface 24 and analyze the errors indicated therein.

Figure 3:
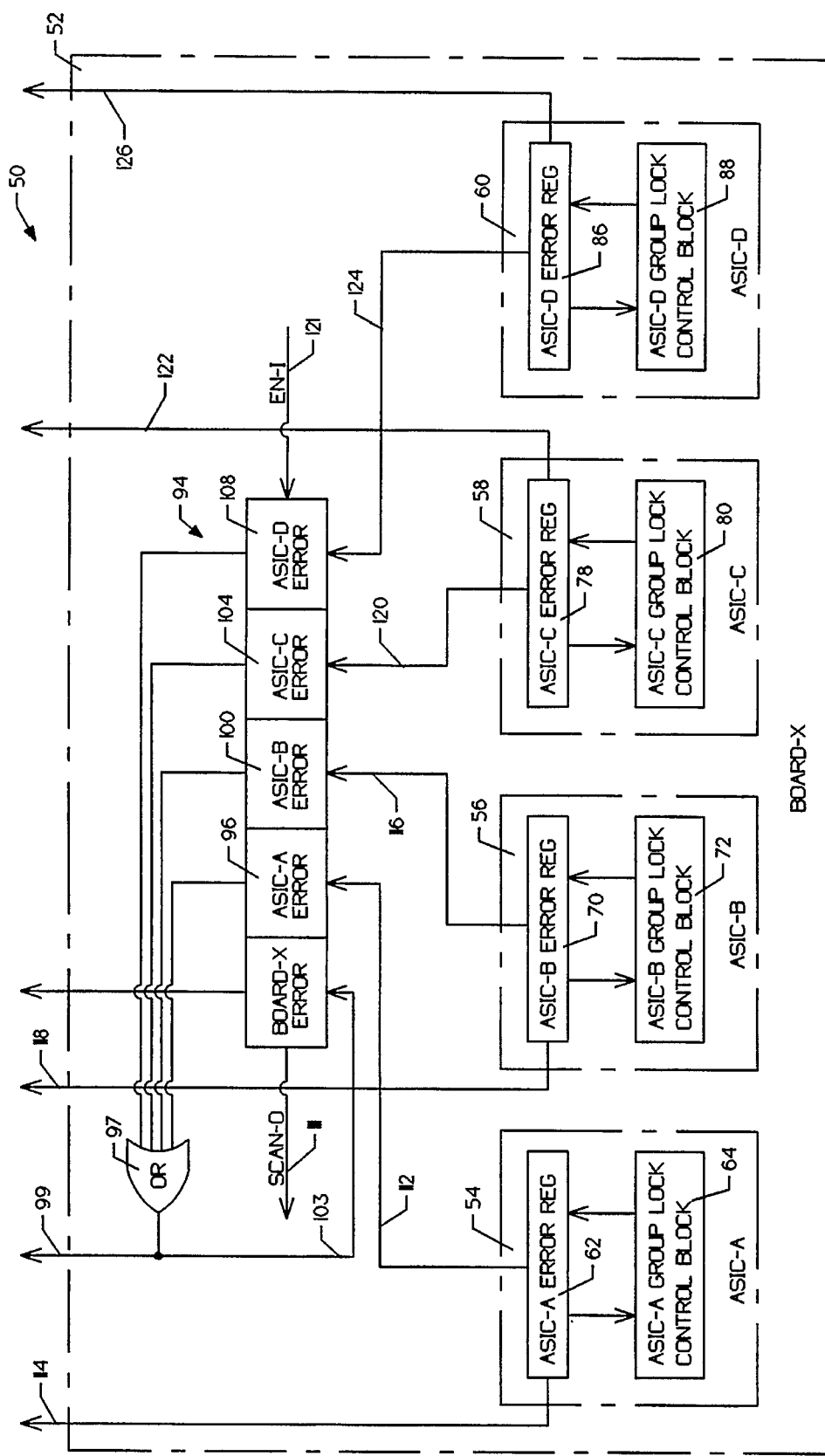
FIG. 3 is a block diagram showing a typical board level error reporting scheme within a computer system.

FIG. 3 is a block diagram showing a typical board level error reporting scheme within a computer system. The diagram is generally shown at 50. In an typical computer system, the system may have a number of circuit boards. Each circuit board may have a number of integrated circuit devices thereon. Each integrated circuit device may have an error detection register therein. A number of error detection units may be provided on a number of critical nodes within each integrated circuit, as described above. Each of the number of error detection units may assert an error bit within the corresponding error register when an error is detected. That is, the error register may have a number of bits wherein each bit may correspond to one or more error detection units. After an error is detected, the corresponding integrated circuit device may freeze the state of the corresponding error detection register, as described above. Freezing the state of the error detection register may allow the system to perform accurate error analysis later. The corresponding error detection register may then assert an error bit within a board level error register and/or notify a corresponding support controller. The board level error register may have an error bit for each integrated circuit device located on the board. In one scheme, the corresponding board may freeze the state of the board level error detection register when an error is indicated by any of the integrated circuits thereon. The board level error detection register may provide a corresponding error signal to a support controller. In another scheme, the support controller may directly read the corresponding error detection register from the corresponding integrated circuit to determine where the fault occurred.

Referring to FIG. 3, a board 52 may consists of a first Application Specific Integrated Circuit (ASIC) 54, a second ASIC 56, a third ASIC 58, and a fourth ASIC 60. The first ASIC 54 may have an error detection register 62 and a group lock control block 64. The second ASIC 56 may have an error detection register 70 and a group lock control block 72. The third ASIC 58 may have an error detection register 78 and a group lock control block 80. Finally, the fourth ASIC 60 may have an error detection register 86 and a group lock control block 88. A number of error detection units may be provided on a number of critical nodes within each ASIC device, as described above. Each of the number of error detection units may assert an error bit within the corresponding error detection register when an error is detected. That is, each error detection register 62, 70, 78, and 86 may have a number of bits wherein each bit may correspond to one or more error detection units. In one scheme, each error detection register 62, 70, 78, and 86 may have a bit for each register within the corresponding ASIC device. After an error is detected, the corresponding group lock control block 64, 72, 80, or 88 may freeze the state of the corresponding error detection register 62, 70, 78, or 86, as described above. Freezing the state of the corresponding error detection register may allow the system to perform accurate error analysis later.

Each of the error detection registers 62, 70, 78, and 86 may provide an error bit to board level error detection register 94 via interfaces 112, 116, 120, and 124, respectively. For example, error detection register 62 may set bit 96 within board level error detection register 94 when an error is detected in ASIC 54. Board level error detection register 94 may have an error bit for each ASIC device 54, 56, 58, and 60 located on the board 52. The corresponding board 52 may then freeze the state of the board level error detection register 94 via interface 121.

An output of each error bit of board level error detection register 94 may be provided to an OR-gate 97 or equivalent as shown. Or-gate 97 may thus indicate that an error has been detected on the board 52. Or-gate 97 may provide an error signal to the support controller via interface 99 and to a board level group lock control block (not shown) via interface 103. In response thereto, a board level group lock control block (not shown) may disable board level error detection register 94 via interface 121 when an error is detected thereon. This may freeze the contents of board level error detection register 94. As indicated above, freezing the state of board level error detection register 94 may allow the system to perform accurate error analysis thereon. Or-gate 97 may further indicate an error to a support controller via interface 99 wherein the support controller may then scan out the contents of board level error detection register 94 via interface 111 and analyze the errors indicated therein.

Using this architecture, the support controller may scan out the contents of board level error detection register 94 and determine which of the ASIC devices 54, 56, 58, and/or 60 may have been the source of the error. Thereafter, the support controller may interrupt the corresponding computer system, and scan out the corresponding error detection register 62, 70, 78, and/or 86 via one of the corresponding interfaces 114, 118, 122, and 126, to determine what portion of the corresponding ASIC may have caused the error.

It is contemplated that the support controller may directly read the contents of board level error detection register 94 to determined which of the ASIC devices may have caused the fault. Thereafter, the support controller may interrupt the corresponding computer system, and scan out the contents of the corresponding error detection register 62, 70, 78, and/or 86 to determine the source of the fault. This may eliminate the need for or-gate 97.

A limitation of the above referenced approach is that the corresponding computer system, or at least a portion thereof, must be taken out of functional mode and placed in a test mode to determine the source of an error. As indicated above, this may require the computer system to be interrupted during the execution of a transaction. In some high reliability computing applications, this may not be acceptable. For example, in the banking industry, high reliability computer systems may be used to process a large number of banking transactions. It may not be acceptable to interrupt the banking computer system whenever a fault is detected, unless the fault is a critical fault which could corrupt a corresponding data base. As can readily be seen, an interruption of the banking computer may cause a transaction to be lost. Similarly, in the airline industry, high reliability computer systems may be used to process a large number of seat reservations. It may not be acceptable to interrupt the airline reservation computer system whenever a fault is detected, unless the fault is a critical fault which could corrupt a corresponding data base. As can readily be seen, an interruption of the airline reservation computer may cause a seat assignment to be lost, thereby allowing a single seat to be assigned to multiple passengers or the like.

Figure 4:
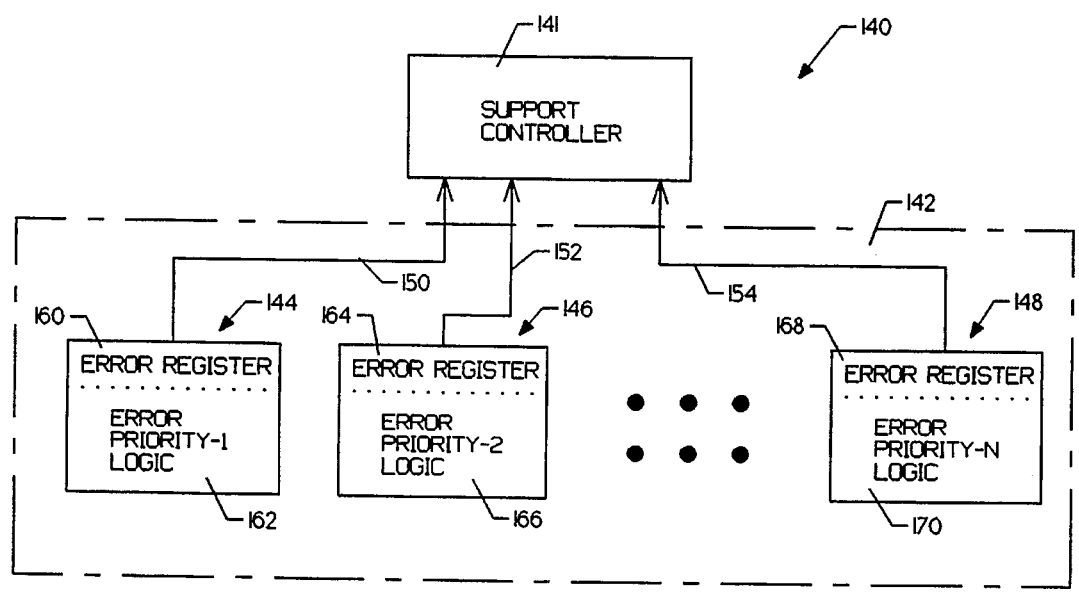
FIG. 4 is a block diagram showing an exemplary error reporting scheme in accordance with the present invention.

FIG. 4 is a block diagram showing an exemplary error reporting scheme in accordance with the present invention. The diagram is generally shown at 140. The exemplary embodiment provides a means for identifying and indicating the severity of a fault within a computer system. In a typical computer system, each fault detected therein may have an affect on the operation of the computer system. For example, a fault detected in a non-essential portion of the computer system may not have an immediate impact on the normal operation of the computer system. A non-essential portion of the computer system may include redundant circuitry, test circuitry, error detection circuitry, initialization circuitry, performance monitoring circuitry, etc. However, a detected fault in an essential portion of the computer system may have an affect on the normal operation of the computer system including the corruption of a corresponding data base.

As indicated above, in some high reliability computing applications, an interruption of the normal operation of a computer system may not be acceptable. For example, in the banking industry, high reliability computer systems may be used to process a large number of banking transactions. It may not be acceptable to interrupt the banking computer system whenever a fault is detected, unless the fault is a critical fault which could corrupt a corresponding data base. As can readily be seen, an interruption of the banking computer may cause a transaction to be lost. Similarly, in the airline industry, high reliability computer systems may be used to process a large number of seat reservations. It may not be acceptable to interrupt the airline reservation computer system whenever a fault is detected, unless the fault is a critical fault which could corrupt a corresponding data base. As can readily be seen, an interruption of the airline reservation computer may cause a seat assignment to be lost, thereby allowing a single seat to be assigned to multiple passengers or the like.

For these and other reasons, it may be important to allow the normal operation of the computer system to continue, despite the detection of a fault within the computer system. That is, if a fault is deemed to be passive, thereby not affecting the normal operation of the computer system, the normal operation of the computer system may be allowed to continue. However, if an error is deemed to be critical, thereby affecting the normal operation of the computer system, the normal operation of the computer system may be interrupted and the fault may be serviced.

It is contemplated that a wide variety of fault types may occur within a computer system. Each of the fault types may have a different affect on the operation of the computer system. In response thereto, it is contemplated that each of the variety of fault types may be handled in a different manner by the computer system. For example, a first fault type may have a minimal affect on the operation of the computer system. An example of a first fault type may be a faulty address location within a memory wherein the faulty address location may be tagged as faulty and a corresponding processor or the like be notified to not use the tagged address location. In this situation, the faulty address location may have a minimal affect on the operation of the computer system. The first fault types may provide an error priority signal to a support controller indicating that the support controller should notify a service technician that the faulty memory needs to be serviced during the next preventive maintenance session. A second fault type may be deemed more critical than the first fault type, but still may have a minimal affect on the operation of the computer system. An example of a second fault type may be a fault detected in a redundant hardware element. The redundant hardware element may not affect the normal operation of the computer system but may affect the reliability thereof. The second fault type may provide an error priority signal to a support controller indicating that the support controller should analyze the error during the next reboot of the computer system. A third fault type may be deemed more critical than the second fault type, but still may not affect the normal operation of the computer system. An example of a third fault type may be a fault detected in an I/O port which is currently not in use. The third fault type may provide an error priority signal to the support controller indicating that the support controller should analyze the error when time permits. That is, the support controller may analyze the error when the utilization of the computer system drops below a predetermined level. A fourth fault type may be deemed more critical than the third fault type, but still may not affect the normal operation of the computer system. For example, the current instruction of the computer system may not utilize a particular hardware element within the computer system. However, the next instruction may utilize the particular hardware element. The fourth fault type may provide an error priority signal to the support controller indicating that the support controller should analyze the error after the current instruction is completed. Finally, a fifth fault type may be deemed more critical than the fourth fault type, and may affect the normal operation of the computer system. For example, a fault may be detected on a bus which is being used by the current instruction. The bus fault may affect the normal operation of the computer system, and may even corrupt a corresponding data base. The fifth fault type may provide an error priority signal to the support controller indicating that the support controller should interrupt the normal operation of the computer system, and analyze the error immediately.

It is recognized that the above referenced five fault types are only exemplary. It is contemplated that any number of fault types may be identified and used and still be within the scope of the present invention. It is further recognized that the support controller response to each of the above described fault types is only exemplary.

Referring to FIG. 4, in an exemplary embodiment of the present invention, the circuitry of a computer system may be divided into a number of groups. Each group may contain circuitry which may result in the same fault type. For example, predetermined circuitry which, when a fault is detected therein, may have a minimal affect on the normal operation of the computer system, may be provided in a first group. Similarly, predetermined circuitry which, when a fault is detected therein, may have an immediate affect on the normal operation of the computer system, may be provided in a second group. Each group may provide an error priority signal to a support controller. The support controller may interpret the number of error priority signals provided by the number of groups and may determine the appropriate time to take corrective action thereon.

In the exemplary embodiment, the circuitry of a computer system 142 may be broken down into a number of groups. A first group is shown at 144. The first group may have a corresponding error detection register 160 as described above. Error detection register 160 may provide an error priority signal to a support controller 141 via interface 150. A second group is shown at 146. The second group may have a corresponding error detection register 164. Error detection register 164 may provide an error priority signal to support controller 141 via interface 152. Similarly, a Nth group is shown at 148. The Nth group may have a corresponding error detection register 168. Error detection register 168 may provide an error priority signal to support controller 141 via interface 154. It is contemplated that any number of groups may be provided within a corresponding system. It is further contemplated that the above referenced error reporting scheme may be utilized in a hierarchical manner, as describe above, to provide error reporting at the board level or above.

Each of the groups 144, 146, and 148 may provide an error priority signal to support controller 141. The support controller may interpret the error priority signals 150, 152, and 154 and may determine the appropriate time to take corrective action thereon. That is, support controller 141 may service the error priority signals 150, 152, and 154.

It is recognized that a particular hardware element within a system may cause a number of fault types. That is, a hardware element may be legitimately assigned to more than one of the predefined groups. Under these circumstances, it is contemplated that the particular hardware element may be placed in the fault group which has an error priority that corresponds to the most severe error that may be caused by the hardware element.

Figure 5:
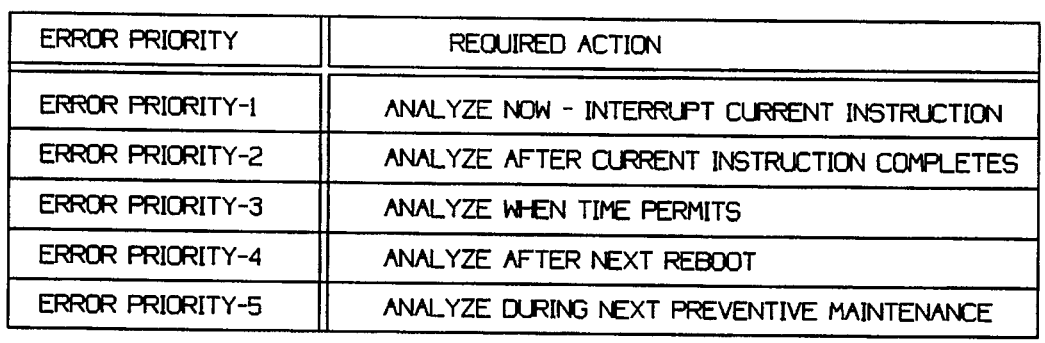
FIG. 5 is a table showing an exemplary error priority scheme in accordance with the present invention.

FIG. 5 is a table showing an exemplary error priority scheme in accordance with the present invention. The table is generally shown at 190. The error priority of a number of corresponding groups is shown in column 192. The action taken for each of the corresponding error priority signals is shown in column 194. A first group may have an error priority of one. Support controller 141 may receive this error priority and interrupt the current operation of the computer system to analyze the error. An error priority of one may be deemed to be a critical error. A second group may have an error priority of two. Support controller 141 may receive this error priority and interrupt the operation of the computer system after the current operating instruction is completed. Support controller 141 may then analyze the error. A third group may have an error priority of three. Support controller 141 may receive this error priority and interrupt the operation of the computer system when time permits. That is when the computer system experiences a period of inactivity, support controller 141 may interrupt the computer system to analyze the error. A fourth group may have an error priority of four. Support controller 141 may receive this error priority and interrupt the operation of the computer system when the computer system is rebooted. At that time, support controller 141 may analyze the error. Finally, a fifth group may have an error priority of five. Support controller 141 may receive this error priority and not interrupt the operation of the computer system but rather a service technician may service the error during a next preventive maintenance session. As can readily be seen, support controller 141 may service the various error priority signals provided thereto.

It is recognized that the above referenced five fault types are only exemplary. It is contemplated that any number of fault types may be identified and used and still be within the scope of the present invention. Further, the action required for each fault type is only exemplary. It is contemplated that the action required for a given fault type may be dependent on the nature of the fault, and the definition of the corresponding group.

Figure 6:
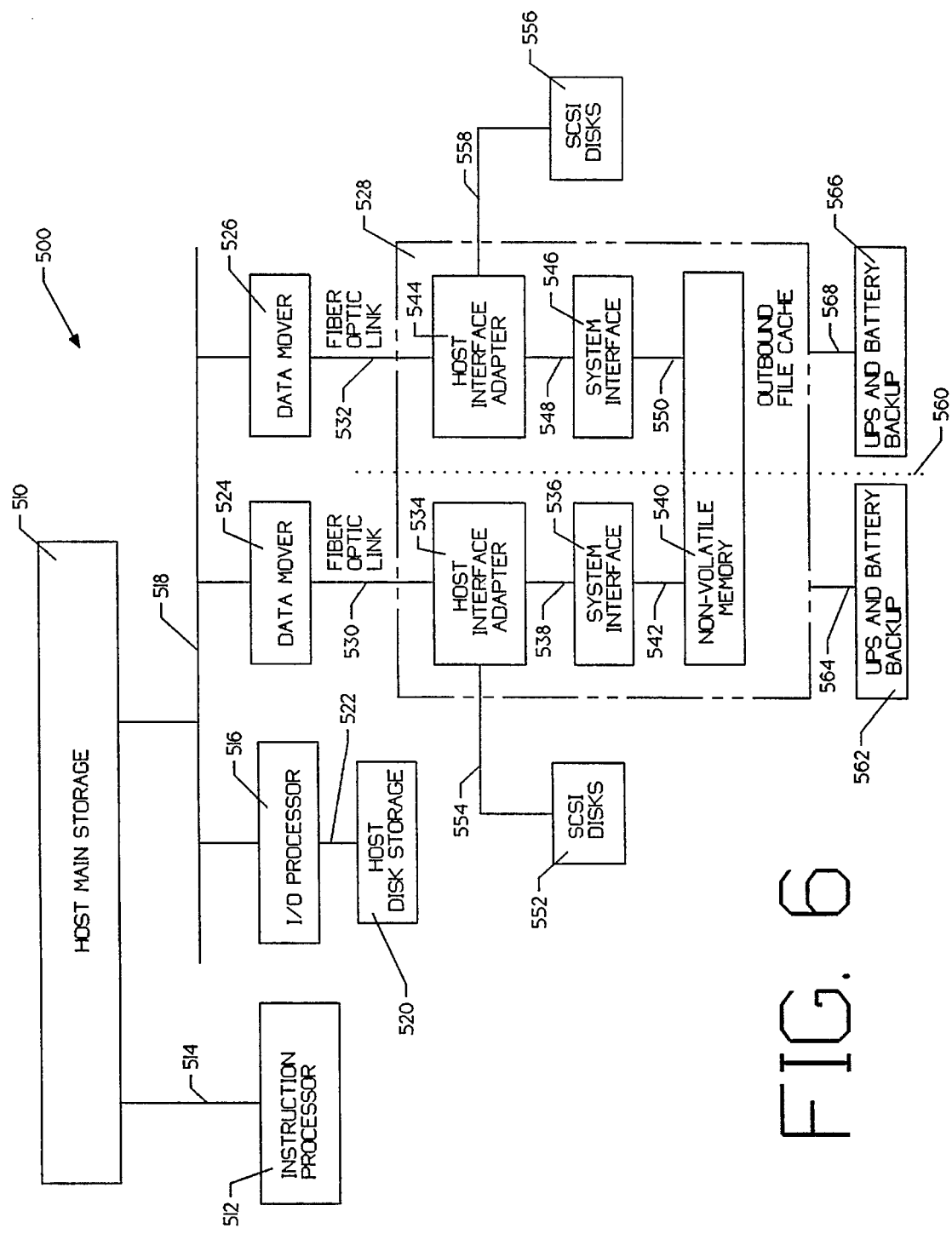
FIG. 6 is a block diagram of an exemplary computer system which may utilize the present invention.

FIG. 6 is a block diagram of an exemplary computer system which may utilize the present invention. The block diagram is generally shown at 500. The XPC comprises an instruction processor 512, an IO processor 516, a host disk storage 520, an outbound File Cache block 528, and a host main storage 510. Instruction processor 512 receives instructions from host main storage 510 via interface 514. Host main storage 510 is also coupled to MBUS 518. I/O processor 516 is coupled to MBUS 518 and is further coupled to host disk storage 520 via interface 522. In the exemplary embodiment, outbound File Cache block 528 is coupled to MBUS 518 through a first data mover 524 and a second data mover 526. Outbound File Cache block 528 may comprise two separate power domains including a power domain-A powered by a universal power source (UPS) and battery backup power source 562 via interface 564, and a power domain-B powered by a UPS power source and battery backup power source 566 via interface 568. The separation of power domain-A and power domain-B is indicated by line 560. UPS and battery backup blocks 562 and 566 may have a detection means therein to detect when a corresponding primary power source fails or becomes otherwise degradated.

Power domain-A of outbound file cache 528 may comprise a host interface adapter 534, a system interface block 536, and a portion of a non-volatile memory 540. Host interface adapter 534 may be coupled to data mover 524 via fiber optic link 530 and may further be coupled to system interface block 536 via interface 538. System interface block 536 may be coupled to non-volatile memory 540 via interface 542, as described above. Similarly, host interface adapter 544 may be coupled to data mover 526 via fiber optic link 532 and may further be coupled to system interface block 546 via interface 548. System interface block 546 may be coupled to non-volatile memory 540 via interface 550, as described above.

The data may be transferred from the host disk storage 520 through I/O processor 516 to host main storage 510. But now, any updates that occur in the data are stored in non-volatile memory 540 instead of host disk storage 520, at least momentarily. All future references then access the data in non-volatile memory 540. Therefore, non-volatile memory 540 acts like a cache for host disk storage 520 and may significantly increases data access speed. Only after the data is no longer needed by the system is it transferred back to host disk storage 520. Data movers 524 and 526 are used to transmit data from the host main storage 510 to the non-volatile memory 540 and vice versa. In the exemplary embodiment, data movers 524 and 526 perform identical cache functions thereby increasing the reliability of the overall system. A more detailed discussion of the XPC system may be found in the above reference co-pending application, which has been incorporated herein by reference.

In accordance with the present invention, a data save disk system 552 may be coupled to host interface adapter 534 via interface 554. Similarly, data save disk system 556 may be coupled to host interface adapter 544 via interface 558. Data save disk systems 552 and 556 may comprise SCSI type disk drives and host interface adapters 534 and 544, respectively, may provide a SCSI interface thereto. In this configuration, the data elements stored in non-volatile memory 540 may be downloaded directly to the data save disk systems 552 and 556. This may permit computer system 500 to detect a power failure in a power domain, switch to a corresponding backup power source 562 or 566, and store all of the critical data elements stored in non-volatile memory 540 on SCSI disk drives 552 or 556 before the corresponding backup power source 562 or 566 also fails.

The primary power sources may comprise a universal power source (UPS) available from the assignee of the present invention. The backup power sources may comprise a limited power source, like a battery. Typical batteries may provide power to a computer system for only a limited time. For some computer systems, a large battery or multiple batteries may be required to supply the necessary power. Further, because the power requirements of some computer systems are substantial, the duration of the battery source may be very limited. It is therefore essential that the critical data elements be downloaded to a corresponding data save disk system 552 or 556 as expediently as possible.

In the exemplary embodiment, backup power source 562 may only power a first portion of non-volatile memory 540, host interface adapter 534, system interface 536, and data save disk system 552. Similarly, backup power source 566 may only power a second portion of non-volatile memory 540, host interface adapter 544, system interface 546, and data save disk system 556. In this configuration, the remainder of computer system 500, including instruction processor 512, I/O processor 516, host main storage 510, and host disk storage 520, may not be powered after the primary power source fails. This may allow backup power sources 562 and 566 to remain active for a significantly longer period of time thereby allowing more data to be downloaded from non-volatile memory 540. In this embodiment, host interface adapters 534 and 544 may have circuitry to support the downloading of the critical data elements to the SCSI disk drives 552 and 556, without requiring any intervention by instruction processor 512 or I/O processor 516.

Coupling data save disk systems 552 and 556 directly to host interface adapters 534 and 544, respectively, rather than to instruction processor 512 or I/O processor 516 may have significant advantages. As indicated above, it may be faster to download the data elements directly from non-volatile memory 540 to data save disk systems 552 or 556, rather than providing all of the data to I/O processor 516 and then to host disk storage 520. Further, significant power savings may be realized by powering only the blocks in outbound file cache 528 and the corresponding data save disk systems 552 or 556, thereby allowing more data to be downloaded before a corresponding backup power source 562 or 566 fails. Finally, data save disk systems 552 and 556 may be dedicated to storing the data elements in non-volatile memory 540 and thus may be appropriately sized.

In a preferred mode, once the data save operation has begun, it continues until all of the data in non-volatile memory 540 has been transferred to the data save disk system. Thereafter, the data save disks are spun down and the outbound file cache 528 is powered down to minimize further drain on the battery backup power source. If the primary power source comes back on during the data save operation, the data save is still completed, but the outbound file cache 528 is not powered down. When primary power is restored, the operation of computer system 500 may be resumed beginning with a data restore operation, but only after the battery backup power source has been recharged to a level which could sustain another primary power source failure.

The data restore operation occurs after normal computer system 500 initialization, including power-up, firmware load, etc. However, before a data restore operation is allowed to begin, the presence of saved data on a corresponding data save disk must be detected. Prior to initiating the data restore operation, the USBC microcode (see FIG. 7) compares the present computer system 500 configuration with the configuration that was present when the data save operation was executed. If the two configurations are not an exact match, the data restore operation is not executed and an error is indicated.

A data save disk set may be added to the outbound file cache 528 as a single or redundant configuration. A single data save set may save one copy of the non-volatile memory 540 contents, and is used when there is only one Universal Power Source (UPS) 562 driving the outbound file cache 528 and data save disks. A redundant data save disk configuration may have two data save disk sets (as shown in FIG. 6) and may save two copies of the non-volatile memory contents. In the redundant configuration, one set of data save disk drives may be powered from one UPS while the another set of data save disk drives may be powered by another UPS.

Figure 7:
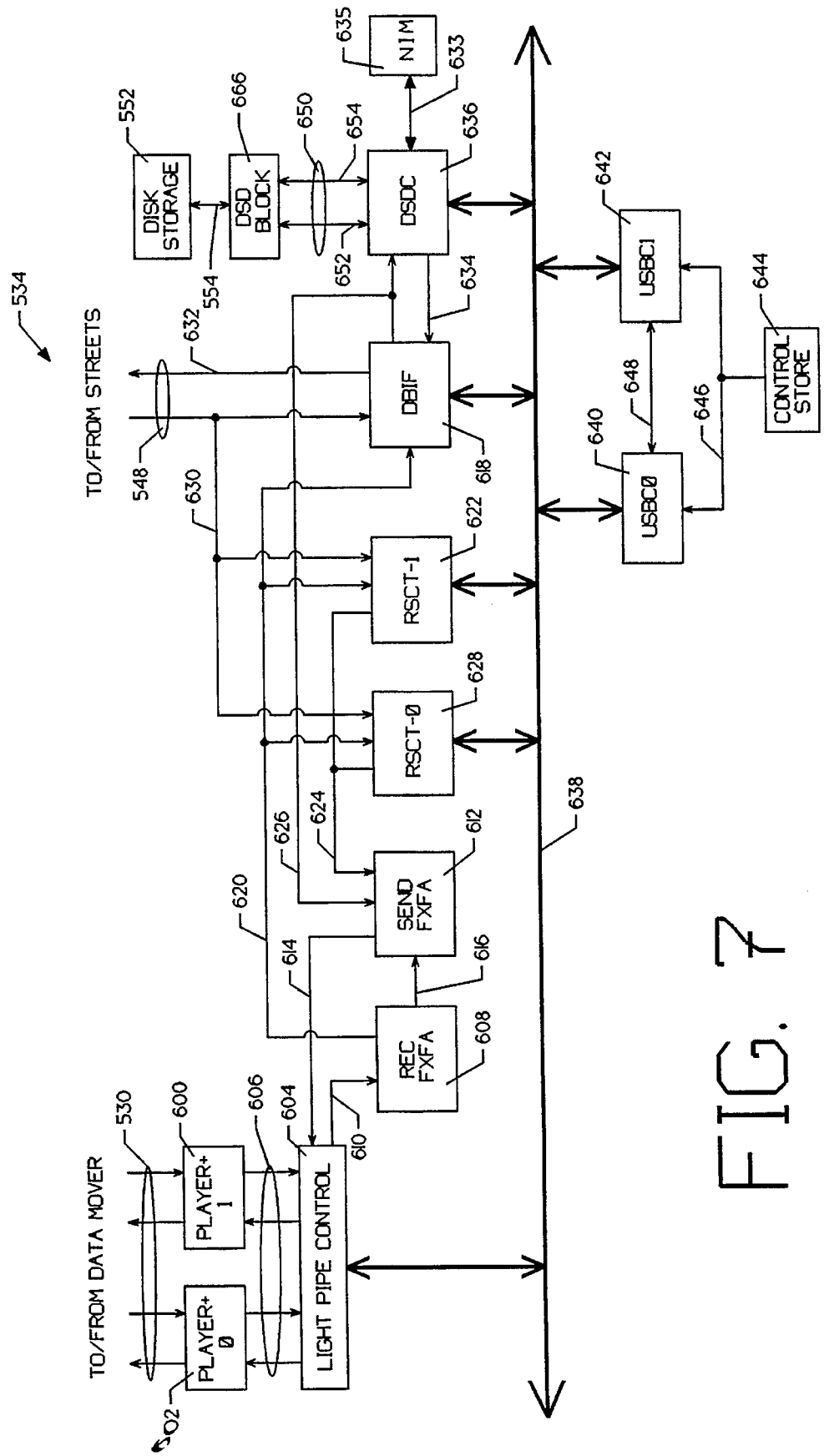
FIG. 7 is a schematic diagram of an exemplary embodiment of the host interface adapter block.

FIG. 7 is a schematic diagram of an exemplary embodiment of the host interface adapter block. For illustration, Host Interface Adapter (HIA) 534 of FIG. 6 is shown. It is recognized that HIA 544 may be similarly constructed. HIA 534 may comprise two Microsequencer Bus Controllers (USBC) 640, 642 which may be connected to a control store 644 via interface 646. The USBC's 640, 642 may access the HIA stations 628, 622, 618, and 636 via a micro bus 638. A player+0 602 and a player+1 600 may receive frames (or data elements) over fiber optic link 530. The term player+ refers to a fiber optic interface controller available from National Semiconductor which is called the Player Plus Chip Set. Player+0 602 may forward its frame to light pipe control 604 via interface 606. Similarly, player+1 600 may forward its frame to light pipe control 604 via interface 606. Light pipe control 604 may transfer the frames to a Receive Frame Transfer Facility (REC FXFA) 608 via interface 610. REC FXFA 608 may unpack the frames and may store control information in a Request Status Control Table-0 (RSCT-0) 628 and a RSCT-1 622 via interface 620. RSCT-0 628 and RSCT-1 622 may monitor the data that has been received from a corresponding data mover. The data which was contained in the frame received by REC FXFA 608 may be sent to the Database Interface (DBIF) station 618 via interface 620. DBIF 618 may forward the data over interface 632 to the streets.

Data received by the DBIF 618 from the streets via interface 548, may be sent to the Send Frame Transfer Facility (SEND FXFA) 612 via interface 626. Control information received via interface 630 may be sent to RSCT-0 628 and RSCT-1 622. SEND FXFA 612 may take the data and the control information provided by RSCT-0 628 and RSCT-1 622 via interface 624, and format a frame for transmission by light pipe control 604. Acknowledgements from REC FXFA 608 may be provided to SEND FXFA 612 via interface 616. The frame may be forwarded to light pipe control 604 via interface 614. Light pipe control 604 may create two copies of the frame received by SEND FXFA 612, and may provided a first copy to player+0 602 and a second copy to player+1 600 via interface 606. The frames may then be transmitted over the fiber optic links 530 to a corresponding data mover.

Referring back to control store 644, control store 644 may be used to store the instructions that are executed by USBC0 640 and USBC1 642. Control store 644, although in reality a RAM, is used as a read-only memory (ROM) during normal operation. Control store 644 may comprise seven (7) SRAM devices (not shown). Each SRAM device may hold 32 * 1024 (K) 8-bit bytes of data. Each unit of data stored in control store 644 may comprise 44 bits of instruction, 8 bits of parity for the instruction, and 2 bits of address parity.

Control store 644 may be loaded with instructions at system initialization by a support computer system through a maintenance path (not shown). The parity bits and address bits are computed by a host computer system and appended to each instruction as it is stored. Later, as USBC0 640 and USBC1 642 read and execute the instructions, each instruction is fetched from control store 644 and parity values are computed from it. Each USBC compares the parity values computed against the parity checks stored in control store 644. If there are any discrepancies, control store 644 is assumed to be corrupted and an internal check condition is raised in the corresponding USBC's.

USBC0 640 and USBC1 642 are special purpose microprocessors that execute instructions to monitor and control the transfer of data on micro bus 638. There are two USBC's in the system to ensure that all data manipulations are verified with duplex checking. One of the USBC's 640 is considered to be the master while the other USBC1 642 is considered the slave. Only the master USBC0 640 drives the data on the micro bus 638, but both master USBC0 640 and slave USBC1 642 drive address and control signals to lower the loading on micro bus 638. The slave USBC1 642 may send the result of each instruction to the master USBC0 640 via interface 648. The master USBC0 640 may then compare this value to the result it computed. If the values are different, an internal check error condition is set and the program is aborted. A further discussion of the operation of HIA 534 may be found in the above referenced co-pending application, which is incorporated herein by reference.

In accordance with the present invention, a data save disk controller (DSDC) 636 may be coupled to micro bus 638 and may thus communicate with USBC0 640 and USBC1 642. DSDC 636 is further coupled to DBIF 618 via interfaces 634 and 626. DSDC may receive data elements from DBIF 618 via interface 626 and may provide data elements to DBIF 618 via interface 634. DSDC 636 is further coupled to a DSD block 666 via a DSD bus 650. In the exemplary embodiment, DSDC 636 may be coupled to DSD block 666 via a DSD address bus 652, a DSD data bus 654, and a number of control signals. DSD block 666 may be coupled to a data save disk system 552 via interface 554. DSD block may provide the interface function between DSDC 636 and data save disk system 552. A network interface module (NIM) 635 may be coupled to DSDC 636 via interface 633. NIM 635 may provide maintenance functions to DSDC 636, and to other elements within the system. USBC0 640 and USBC1 642 may control the operation of a download and/or upload operation between a non-volatile memory 540 and data save disk system 552. This may include providing a timer function to delay the download and/or upload operation for a predetermined time period.

In this configuration, data save disk system 552 is directly coupled to non-volatile memory 540 via DSD block 666, DSDC 636, DBIF 618, and system interface 536 (see FIG. 6). When a primary power source fails, the data elements stored in non-volatile memory 540 may be downloaded directly to the data save disk system 552 without any intervention by an instruction processor 512 or I/O processor 516. This configuration may have a number of advantages. First, the speed at which the data elements may be downloaded from non-volatile memory 540 to data save disk system 552 may be enhanced due to the direct coupling therebetween. Second, significant power savings may be realized because only HIA 534, data save disk system 552, system interface 536, and non-volatile memory 540 need to be powered by the secondary power source to effect the download operation. This may significantly increase the amount of time that the secondary power source may power the system thereby increasing the number of data elements that can be downloaded.

Similarly, once the primary power source is restored, data save disk system 552 may upload the data elements directly to non-volatile memory via DSD block 666, DSDC 636, DBIF 618, and system interface block 536, without any assistance from an instruction processor 512 or I/O processor 516. This may provide a high speed upload link between data save disk system 552 and non-volatile memory 40.

Figure 8:
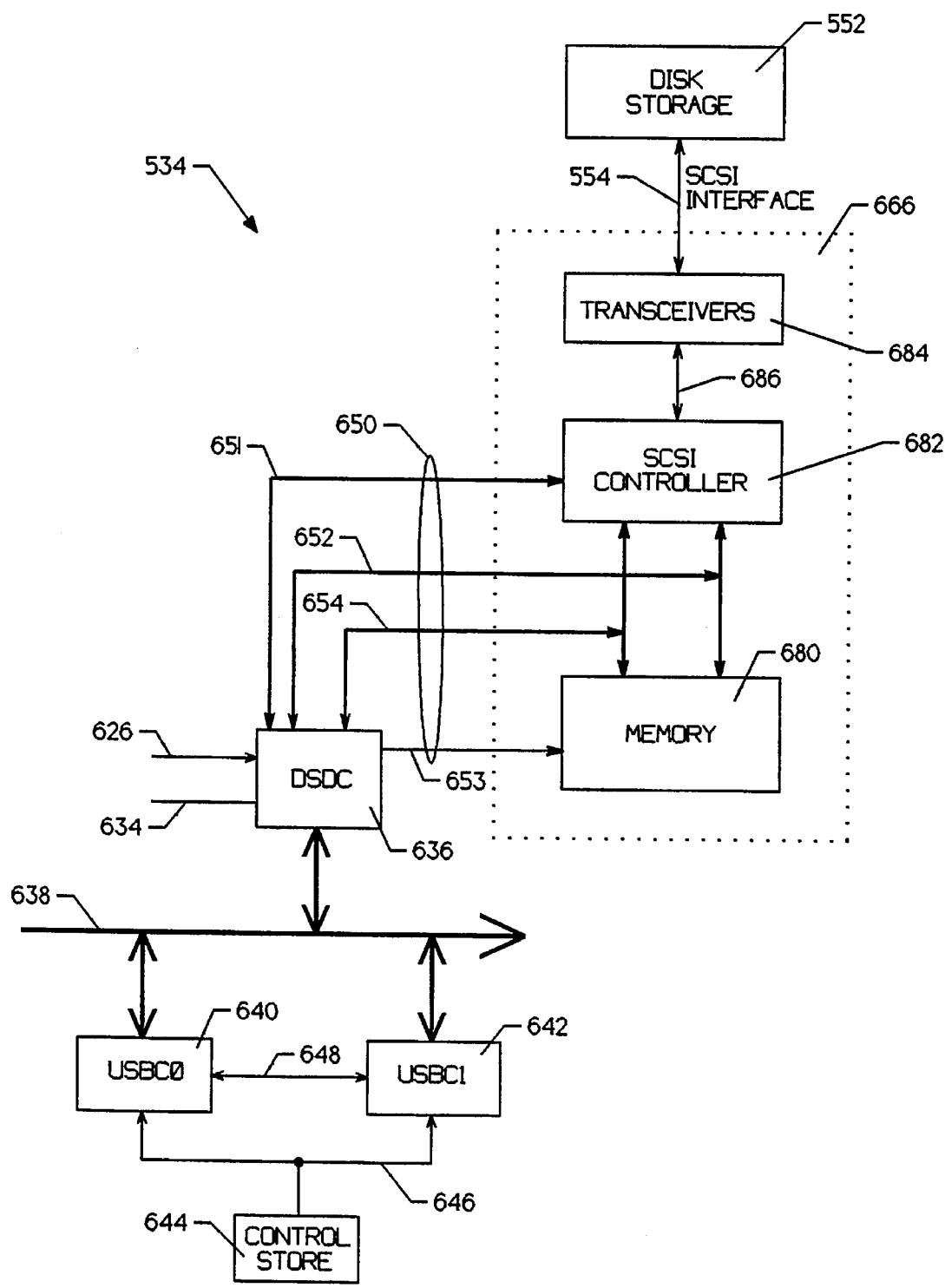
FIG. 8 is a partial schematic diagram of the host interface adapter block detailing the data save disk interface.

FIG. 8 is a partial schematic diagram of the host interface adapter block detailing the data save disk interface. DSD block 666 may comprise a memory 680, a disk controller 682, and a set of transceivers 684. A DSD bus 650 may couple DSDC 636, memory 680, and disk controller 682, and may comprise an address bus 652, and a data bus 654. DSD bus 650 may further comprise a number of disk controller control signals 651, and a number of memory control signals 653. DSD bus 650 may operate generally in accordance with a standard master/slave bus protocol wherein the DSDC 636, disk controller 682, and memory 680 may be slave devices, but only DSDC 636 and disk controller 682 may be master devices. That is, memory 680 may not be a master device in the exemplary embodiment.

Disk controller 682 may be coupled to transceivers 684 via interface 686. Transceivers 684 may be coupled to data save disk system 552 via interface 554. In a preferred mode, interface 554 may be a SCSI interface. Disk controller 682 may be a SCSI disk controller and data save disk storage system 552 may comprise at least one SCSI disk drive. In a preferred embodiment, disk controller 682 may be a NCR53C720 SCSI I/O Processor currently available from NCR corporation. Further, the at least one SCSI disk drives of data save disk storage 552 may comprise Hewlett Packard C3010 5.25" drives, Fijitsu M2654 5.25" drives, or Seagate ST12550/ND 3.5" drives. The data save disk system may comprise a set of 2-GByte SCSI Disks in sufficient quantity to store a single copy of the entire contents of the XPC. The NCR I/O processor may provide the necessary SCSI interface between DSDC 636 and the at least one disk drives of data save disk system 552.

As indicated with reference to FIG. 7, USBC0 640 and USBC1 642 may be coupled to MBUS 638. Further, USBC0 640 and USBC1 642 may be coupled to control store 644 via interface 646. DSDC 636 may be coupled to micro bus 638, DBIF 618, and DSD block 666.

Memory 680 may comprise at least one RAM device. In a preferred mode, memory 680 comprises four RAM devices. Because the disk storage system is an addition to an existing HIA design, control store 644 may not have enough memory locations to store the added pointers and temporary data needed to support the data save disk function. Therefore, a primary function of memory 680 is to store the pointers and temporary data for USBC0 640 and USBC1 642 such that HIA 534 may support the disk data save function. Another primary function of memory 680 is to store SCRIPTS for disk controller 682. SCRIPT programs and the application thereof are discussed in more detail below. Additions to the USBC microcode which may be stored in memory 680 may provide the following functionality: (1) initialization of the data save disk system 552 and microcode control areas; (2) data save operation which may copy all of the data and control elements from non-volatile memory 540 to data save disk system 552; (3) data restore operation which may copy all of the data and control elements from data save disk system 552 to non-volatile memory 540; (4) checking the status of the disks in data save disk storage system 552 and informing maintenance if restore data exists thereon; and (5) various error detection and error handling subroutines.

As indicated above, USBC0 640 and USBC1 642 may read pointers and/or temporary data or the like from memory 680 through DSDC 636. To accomplish this, USBC0 640 and USBC1 642 may provide an address to DSDC 636 wherein DSDC 636 may arbitrate and obtain control of DSD bus 650. Once this has occurred, DSDC 636 may provide the address to memory 680. Memory 680 may then read the corresponding address location and provide the contents thereof back to DSDC 636 via DSD bus 650. DSDC 636 may then provide the pointers and/or temporary data or the like to USBC0 640 and USBC1 642 for processing. By using this protocol, USBC0 640 and USBC1 642 may obtain pointers and/or temporary data from memory 680 to control the operation of a download and/or upload operation between non-volatile memory 540 and data save disk system 552. This may include providing a timer function to delay the download and/or upload operation for a predetermined time period.

Data save disk system 552 is directly coupled to non-volatile memory 540 via DSD block 666, DSDC 636, DBIF 618, and system interface 536 (see FIG. 6). When a primary power source fails, and under the control of USBC0 640 and USBC1 642, DBIF 618 may read the data elements from non-volatile memory via interface 630 wherein DBIF 618 may provide the data elements to DSDC 636 via interface 626. DSDC 636 may then perform arbitration for DSD bus 650, wherein the data elements may be read by disk controller 682. In this instance, disk controller 682 may be the bus master. Disk controller 682 may then provide the data elements to transceivers 684 wherein the data elements may be written to data save disk system 552. This configuration may have a number of advantages. First, the speed at which the data elements may be downloaded from non-volatile memory 540 to data save disk system 552 may be enhanced due to the direct coupling therebetween. Second, significant power savings may be realized because only HIA 534, system interface 536, non-volatile memory 540, and data save disk system 552 need to be powered by the secondary power source to effect the download operation. This may significantly increase the amount of time that the secondary power source may power the system thereby increasing the number of data elements that may be downloaded.

Similarly, once the primary power source is restored, data save disk system 552 may upload the data elements directly to non-volatile memory via DSD block 666, DSDC 636, DBIF 618, and system interface block 536, without any assistance from an instruction processor 512 or I/O processor 514. This may provide a high speed upload link between data save disk system 552 and non-volatile memory 540.

Figure 9A:
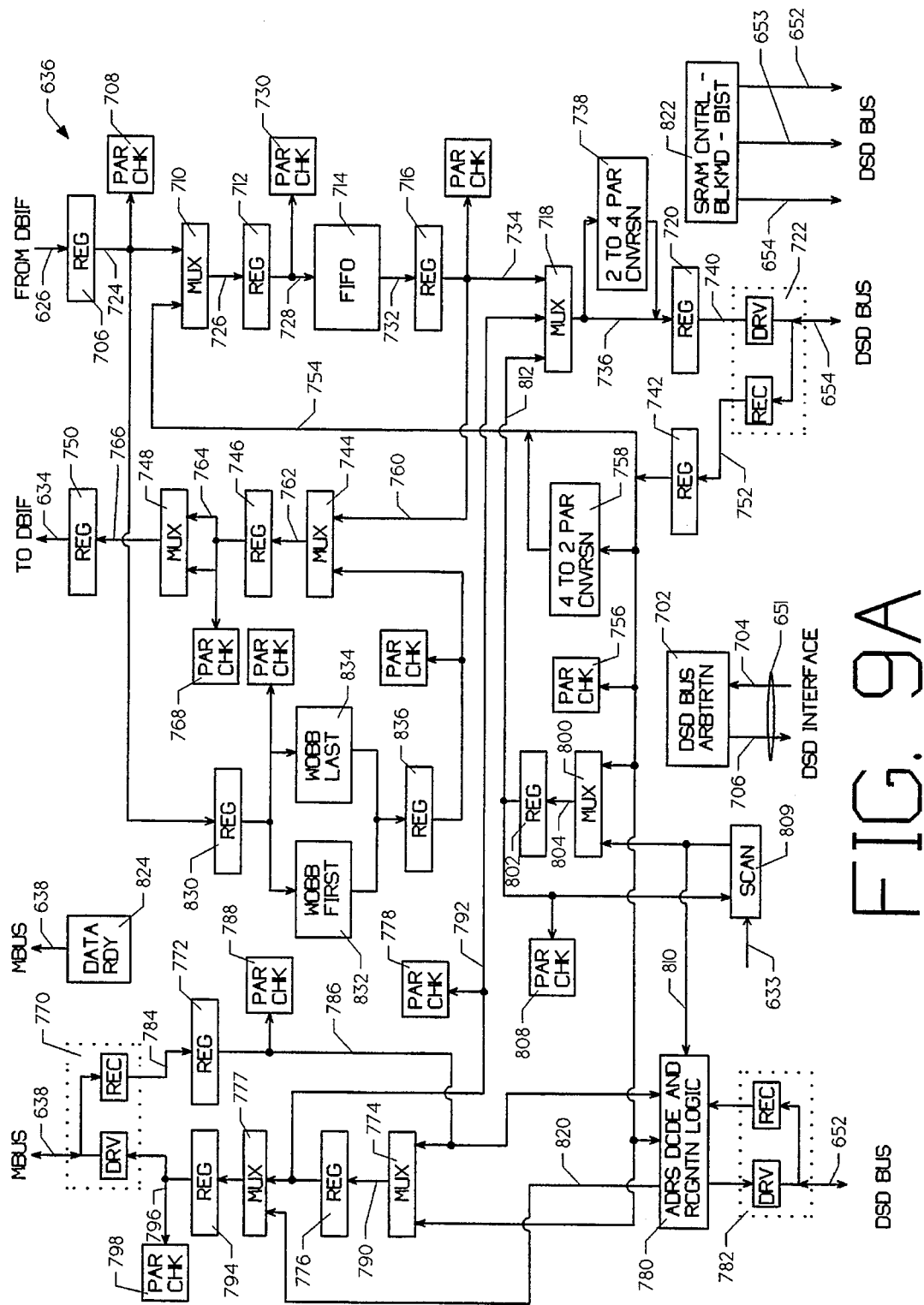
FIG. 9A is a block diagram of the Data Save Disk Chip (DSDC) shown in FIGS. 7–8.

FIG. 9A is a block diagram of the Data Save Disk Controller (DSDC) shown in FIGS. 7–8. The block diagram is generally shown at 636. DSDC 636 may comprise a DSD bus arbitration and control block 702 which may control the arbitration of DSD bus 650. DSD bus arbitration and control 702 may determine which device may assume the role of bus master of DSD bus 650. Preemptive priority is used to determine which device becomes bus master when more than one device is requesting bus mastership at any given time. In the exemplary embodiment, the priority order of bus mastership, from high priority to low priority, may be as follows: disk controller 682, USBC blocks 640, 642, and finally network interface module (NIM) 635. Memory 680 is not allowed to assume bus mastership of DSD bus 650 in the exemplary embodiment. DSD bus arbitration and control block 702, may be coupled to disk controller 682 via interface 651 (see FIG. 8). Interfaces 704 may be a bus request from disk controller 682 and interface 706 may be a bus acknowledge signal to disk controller 682.

In an exemplary embodiment, when disk controller 682 assumes bus mastership, it may relinquish bus ownership after a maximum of 16 bus cycles. Disk controller 682 may then wait 5 clock cycles before asserting a bus request to regain bus mastership. The 5 clock cycles provides a "fairness" delay to allow DSDC 636 to gain bus mastership if required.

DSDC 636 may comprise at least four basic data paths. A first basic data path may provide an interface between DBIF 618 and DSD bus 650. This path may comprise a register 706, a multiplexer 710, a register 712, a FIFO block 714, a register 716, a multiplexer 718, a data-out-register 720, and an I/O buffer block 722. Register 706 may receive data elements from DBIF 618 via interface 626. Register 706 may be coupled to multiplexer 710 via interface 724. Also coupled to interface 724 may be a parity check block 708. Parity Check block 708 may check the parity of a data element as it is released from register 706.

Multiplexer 710 may select interface 724 when transferring data between DBIF 618 and DSD bus 650. The data may then be provided to register 712 via interface 726 wherein register 712 may stage the data for FIFO 714. The data may then be provided to FIFO 714 via interface 728. Also coupled to interface 728 may be a parity check block 730. Parity Check block 730 may check the parity of a data element as it is released from register 712.

FIFO 714 may comprise a 34 bit by 64 word FIFO. FIFO 714 may function as a buffer between DBIF 618 and DSD bus 650. This may be desirable because disk controller 682 may have to arbitrate for DSD bus 650, thus causing an unpredictable delay. FIFO 714 may store the data that is transferred by DBIF 618 to DSDC 636 until disk controller 682 is able to gain control of DSD bus 650. Once disk controller 682 gains access to DSD bus 650, FIFO 714 may wait for eight (8) words to be transferred from DBIF 618 to FIFO 714 before sending the data over DSD bus 650.

Once released by FIFO 714, the data may be provided to register 716 via interface 732. Register 716 may store the output of FIFO 714. The data may then be provided to multiplexer 718 via interface 734. Multiplexer 718 may select interface 734 when transferring data between DBIF 618 and DSD bus 650. The data may then be provided to data-out-register 720 via interface 736, wherein data-out-register 720 may stage the data for I/O buffer block 722. Parity conversion block 738 may provide a two to four bit parity conversion. That is, data arriving from DBIF 618 via multiplexer 718 may only have two parity bits associated therewith. It may be desirable to convert the two parity bits to a four parity bit scheme. Data-out-register 720 may then provide the data to I/O buffer block 722 via interface 740. I/O buffer block 722 may comprise a plurality of bi-directional transceivers wherein each of the transceivers may be enabled to drive the data onto DSD bus 650 via interface 654.

A second basic data path of DSDC 636 may provide an interface between DSD bus 650 and DBIF 618. This path may comprise I/O buffer block 722, a data-in-register 742, multiplexer 710, register 712, FIFO block 714, register 716, a multiplexer 744, a register 746, a multiplexer 748, and a register 750. For this data path, I/O buffer block 722 may be enabled to accept data from DSD bus 650 and provide the data to data-in-register 742 via interface 752. Data-in-register 742 may provide the data to multiplexer 710 via interface 754. Also coupled to interface 754 may be a parity check block 756. Parity Check block 756 may check the parity of a data element as it is released by data-in-register 742. Parity conversion block 758 may provide a four to two bit parity conversion. That is, data arriving from DSD bus 650 may have four parity bits associated therewith while DBIF interface 634 may only have two parity bits associated therewith. It may be desirable to convert the four parity bits to a two parity bit scheme.

Multiplexer 710 may select interface 754 when transferring data between DSD bus 650 and DBIF 618. The data may then be provided to register 712 via interface 726 wherein register 712 may stage the data for FIFO 714. The data may then be provided to FIFO 714 via interface 728. Also coupled to interface 728 may be parity check block 730. Parity Check block 730 may check the parity of a data element as it is released from register 712.

FIFO 714 may function as a buffer between DSD bus 650 and DBIF 618. This may be desirable because DBIF 618 may have to wait to gain access to the streets via interface 632. FIFO 714 may store data that is transferred by DSD bus 650 until DBIF 618 can gain access to the streets.

Once released by FIFO 714, the data may be provided to register 716 via interface 732. Register 716 may store the output of FIFO 714. The data may then be provided to multiplexer 744 via interface 760. Multiplexer 744 may select the data provided by register 716 during a data transfer between DSD bus 650 and DBIF 618. Multiplexer 744 may then provide the data to register 746 via interface 762. Register 746 may then provide the data to multiplexer 748 via interface 764. Multiplexer 748 may select 16 bits at a time of a 32 bit word provided by register 746. This may be necessary because the DSD bus may comprise a 32 bit word while the interface to DBIF 618 may only be 16 bits wide. Also coupled to interface 764 may be parity check block 768. Parity Check block 768 may check the parity of a data element as it is released from register 746. Multiplexer 748 may then provide the data to register 750. Register 750 may provide the data to DBIF 618 via interface 634.

A third basic data path of DSDC 636 may provide an interface between MBUS 638 and DSD bus 650. This path may comprise a I/O buffer block 770, a register 772, an address decode and recognition logic block 780, a multiplexer 774, a register 776, multiplexer 718, data-out-register 720, and I/O buffer block 722. For this data path, USBC's 640, 642 may provide a request to DSDC 636 via MBUS 638. The request may comprise a data word, an address, and/or a number of control signals. In the exemplary embodiment, a request comprising an address and a number of control signals may be provided over MBUS 638 first wherein a data word may follow on MBUS 638, if appropriate. I/O buffer block 770 may receive the request via interface 638 and may provide the request to register 772 via interface 784. Register 772 may provide the request to multiplexer 774 and to an address decode and recognition block 780 via interface 786. Also coupled to interface 786 may be a parity check block 788. Parity Check block 788 may check the parity of the request as it is released from register 772. Multiplexer 774 may select interface 786 during transfers from MBUS 638 to DSD bus 650. Multiplexer 774 may provide the request to register 776 via interface 790. Register 776 may then provide the request to multiplexer 718 via interface 792. Also coupled to interface 792 may be a parity check block 778. Parity Check block 778 may check the parity of the request as it is released from register 776.

Multiplexer 718 may select interface 792 when transferring data between MBUS 618 and DSD bus 650. Multiplexer 718 may provide the data word to data-out-register 720 via interface 736 wherein data-out-register 720 may stage the data word for I/O buffer block 722. Parity conversion block 738 may provide a two to four bit parity conversion. That is, data arriving from MBUS 638 via multiplexer 718 may only have two parity bits associated therewith. It may be desirable to convert the two parity bits to a four parity bit scheme. Data-out-register 720 may then provide the data word to I/O buffer block 722 via interface 740. I/O buffer block 722 may be enabled to drive the data word onto DSD bus 650 via interface 654.

A fourth basic data path of DSDC 636 may provide an interface between DSD bus 650 and MBUS 638. This path may comprise I/O buffer block 722, data-in-register 742, parity conversion block 758, multiplexer 774, a multiplexer 777, register 776, a register 794, and I/O buffer block 770. I/O buffer block 722 may receive a data element from DSD bus 650. In an exemplary embodiment, the data element may comprise pointers and/or temporary data requested by USBC0 640 or USBC1 642 from memory 680. I/O buffer block 722 may provide the pointers and/or temporary data to data-in-register 742 via interface 752. Data-in-register 742 may provide the pointers and/or temporary data to parity conversion block 758 via interface 754. Parity conversion block 758 may provide a four to two bit parity conversion thereof. Parity conversion block 758, and register 742 may then provide the pointers and/or temporary data to multiplexer 774 via interface 754. Multiplexer 774 may select interface 754 when transferring data between DSD bus 650 and MBUS 638. Multiplexer 774 may then provide the pointer and/or temporary data to register 776 via interface 790. Register 776 may provide the pointers and/or temporary data to multiplexer 777 via interface 792. Multiplexer 777 may select interface 792 when transferring data between DSD bus 650 and MBUS 638. Multiplexer 777 may provide the pointers and/or temporary data to register 794. Register 794 may provide the pointers and/or temporary data to I/O buffer block 770 via interface 796. Also coupled to interface 796 may be a parity check block 798. Parity Check block 798 may check the parity of the data as it is released from register 794. I/O buffer block 770 may provide the pointers and/or temporary data to USBC0 640 or 642 via MBUS 638.

USBCs 640 and 642 do not interface directly with DSD bus 650 but rather may access memory 680 and disk controller 682 indirectly using registers in DSDC 636. For example, when USBC0 640 performs a read of memory 680, it initiates the transfer by writing a DSDC register 772 with the requested address. Register 772 may provide the address to address recognition logic block 780 via interface 786. The address may then be provided to register 773 (see FIG. 9B). Register 773 may then provide the address to multiplexer 852. Multiplexer 852 may select the output of register 773 when transferring an address from USBC0 640 to memory 680. Multiplexer 852 may then provide the address to address register 856 via interface 858.

DSDC 636 then performs bus arbitration, and provides the address to memory 680 via I/O transceiver block 782. Memory 680 then provides the requested data on DSD bus 650. DSDC 636 may then read the data on DSD bus 650 and provide the result to MBUS 638. Referring to FIG. 9A, register 742 may receive the read data word and may provide the read data word to multiplexer 774 via interface 754. Multiplexer 774 may then provide the read data word to register 776 wherein register 776 may provide the read data word to multiplexer 777. Multiplexer 777 may then provide the read data word to register 794 wherein the read data word may be provided to USBC0 640 via I/O buffer 770. Depending on whether an address or a data word is provided by USBC0 640 via MBUS 638, the corresponding address or data element may be routed to the appropriate location within DSDC 636.

In addition to providing the above reference data paths, DSDC 636 may provide a number of other functions. For example, logic may be provided to allow a test function of memory 680 and disk controller 682. For example, DSDC 636 may have a dynamic scan register 809 which may be coupled to NIM 635 via interface 633. NIM 635 may scan in an address and a function code into dynamic scan register 809. The address may then be provided to address register 851 (see FIG. 9B) within address decode and recognition logic block 780 via interface 810. Register 851 may provide the address to address output register 856 via multiplexer 852.

For a dynamic read operation of memory 680, the address may be an initial read address which may be scanned into dynamic scan register 809 as described above. Thereafter, the address may be automatically incremented by an auto-increment block 826 (see FIG. 9B) such that a number of successive read operations may be made to memory 680. After the initial address is provided, NIM 635 may provide a control word to dynamic scan register 809. The control word may comprise a word count and a function code. For a read operation, the function code may indicate a read function. The word count may be latched into a word count register 853 (see FIG. 9B) wherein after each read operation, the word count register may be decremented. When the word count register reaches a value of zero, DSDC 636 may terminate the above referenced read operation. For each read operation performed, the resulting data may be latched into data-in-register 742. A multiplexer 800 may then select interface 754 thereby storing the resulting data into register 802. The data may then be provided to dynamic scan register 809 via interface 812. The resulting data may then be scanned out of dynamic scan register 809 via NIM 635 for analysis.

For a write operation, the address may be an initial write address and function code which may be scanned into dynamic scan register 809 as described above. Thereafter, the address may also be automatically incremented by an auto-increment block 826 (see FIG. 9B) such that a number of successive write operations may be made to memory 680. For a write operation, the function code may indicate a write function. For each write operation performed, a corresponding data word may be scanned into dynamic scan register 809. The data word may be provided to multiplexer 800 wherein multiplexer 800 may provide the data word to register 802. Register 802 may provide the data word to multiplexer 718 via interface 812. Multiplexer 718 may provide the data word to data-out-register 720 via interface 736 wherein data-out-register 720 may stage the data word for I/O buffer block 722. Data-out-register 720 may then provide the data word to I/O buffer block 722 via interface 740. I/O buffer block 722 may be enabled to drive the data word to memory 680 via interface 654. The exemplary read and write operations discussed above may be used to perform tests on memory 680 and/or disk controller 682.

Another exemplary function that may be provided by DSDC 636 may be to support a partial block update function provided by host interface adapter 534. That is, in the exemplary system, a file may comprise a plurality of segments and each of the plurality of segments may comprise a plurality of blocks. Each of the blocks may comprise a plurality of words. When a host processor only updates a portion of a file, it may be advantages to only over-write the affected portions of the file to non-volatile memory 540. The host interface adapter block 534 supports the partial block update function. However, some of the supporting logic is located on DSDC ASIC 636. The partial block update function may increase the performance of the file caching system.

Register 830, wobb first block 832, wobb last block 834, and register 836 may support the partial block update function of the host interface adapter 534. A further discussion of the partial block update function may be found in the above referenced co-pending patent application Ser. No. 08/172,663, which is incorporated herein by reference.

SRAM control-block mode-and bist block 822 may provide a number of functions. For example, SRAM control-block mode-and bist block 822 may provide a number of control signals to memory 680 via interface 653. Other exemplary function may be to provide error detection and test to memory 680.

Finally, DSDC 636 may provide a data ready block 824 which may be coupled to MBUS 638. Data ready block 824 may indicate to USBC 640,642 when a corresponding read operation has been completed by DSDC 636.

Figure 9B:
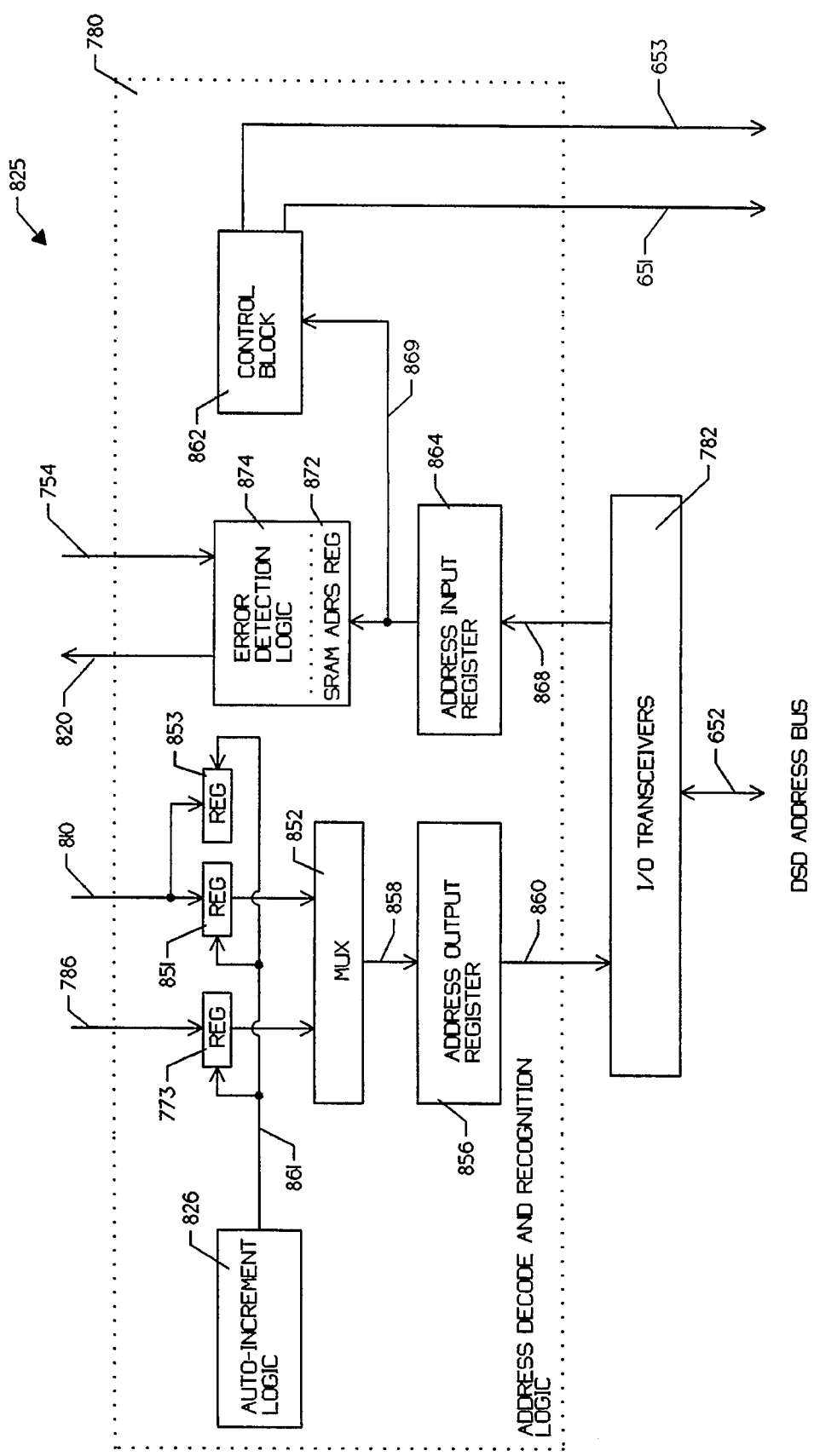
FIG. 9B is a block diagram showing applicable portions of the Address and Recognition Logic block of FIG. 9A.

FIG. 9B is a block diagram showing applicable portions of the Address and Recognition Logic block of FIG. 9A. The block diagram is generally shown at 825. In the exemplary embodiment, Address and Recognition Logic block 780 may comprise an address output register 856 and an address input register 864. Address output register 856 may be coupled to an outgoing port of I/O buffer block 782 via interface 860. Similarly, address input register 864 may be coupled to an in-going port of I/O buffer block 782 via interface 868.

An address may be provided to register 773 by MBUS 638 via interface 786, as described above. Further, an address may be provided to register 851 by dynamic scan register 809 via interface 810, as described above. When MBUS 638 is providing an address to DSD address bus 652, multiplexer 852 may select the output of register 773. Similarly, when NIM 635 is providing an address via dynamic scan register 809, multiplexer 852 may select the output of register 851. Multiplexer 852 may provide the selected address to address output register 856 via interface 858. Address output register 856 may provide the address to DSD address bus 652 via I/O buffer block 782.

Address recognition block 780 may determine if a request on interface 786 comprises an address. If the request comprises an address, corresponding control signals provided by register 772 via interface 786 may determine the appropriate format thereof. For example, one format for an address may indicate that the present address should be loaded, but each address thereafter should be generated by an automatic increment block 826 (see FIG. 11). Address recognition logic block 780 may make this determination and alert auto-increment block 826. Auto-increment block 826 may thereafter automatically increment and/or decrement the value in registers 773, 851, or 853 via interface 861.

Address input register 864 may be coupled to DSD address bus 652 via I/O buffer block 782. Address input register 864 may latch the contents of DSD address bus 652 and monitor the contents thereof. Address input register 864 may be coupled to a control block 862 via interface 869. Control block 862 may monitor the DSD address via the address input register 864 and provide appropriate control signals to DSD bus 650 via interfaces 651 and 653. In the exemplary embodiment, control block 862 may provide control signals that memory 680 and disk controller 682 may not otherwise provide. For example, control block 862 may provide four (4) byte enable signals, and a read/write enable signal (see FIG. 10A-10B) to memory 680 via interface 653. Also, the NCR53C720 SCSI controller 682 requires a ready-in signal to be asserted by a slave device indicating that the slave device is ready to transfer data. DSDC ASIC 636 may provide the ready-in signal to NCR53C720 SCSI controller 682 via interface 651 for both DSDC 636 and memory 680.

Finally, an error detection logic block 874 may be coupled to address input register 864 via interface 869. Error detection logic block 874 may comprise an SRAM address register 872. SRAM address register 872 may capture an SRAM address when an SRAM read error is detected. That is, SRAM address register 872 may store the read address that is present on DSD address bus 650 in response to an SRAM read error. Error detection block 874 may monitor the data that is present in DSD bus 650 via interface 754. Error detection block 874 may thus perform a parity check or the like on the data presently read from memory 680. If an error exists, error detection block 874 may enable SRAM address register thereby capturing the current read address. This may identify the faulty read address within memory 680. Error detection block 874 may then provide the faulty read address to USBC0 640 for further processing via interface 820. For example, USBC0 640 may read and write various test patterns to the faulty read address to determine if the fault was caused by a soft error or a hard error. If the fault was caused by a soft error, the contents of memory 680 may be reloaded and the operation of the computer system may continue. However, if the fault was caused by a hard error, the operation of the computer system may be interrupted. Other error detection schemes are contemplated and may be incorporated into error detection block 874.

FIGS. 10A-10B comprise a table illustrating an exemplary bus description of the DSD bus of FIG. 8. The table is generally shown at 900. DSD bus 650 may comprise a number of fields. The type of fields can be generally broken down into data fields, address fields, parity fields, and control fields. The fields for an exemplary embodiment of DSD bus 650 are described below.

DSD bus 650 may comprise a 32 bit data bus as shown at 902. The 32 bit data bus is a bi-directional data bus and may serve as the main data path for all operations. The 32 bit data bus may be asserted by a bus master for write operations and a bus slave for read operations.

DSD bus 650 may further comprise a 4 bit data parity bus as shown at 904. Each of the four parity bits may correspond to predetermined data bits of 32 bit data bus 902. The 4 bit data parity bus may be used for error detection and correction purposes.

DSD bus 650 may further comprise a 30 bit address bus as shown at 906. The 30 bit address bus is a bi-directional address bus and may serve as the main address path for all operations. The 30 bit address bus may be asserted by a bus master.

DSD bus 650 may further comprise an address status line (ADS) as shown at 908. The address status line may be active low and when asserted by a bus master, may indicate that the value on the 30 bit address bus 906 are valid. In an exemplary mode, the address status line may be asserted to indicate a start of a bus cycle.

DSD bus 650 may further comprise a write/read line (W-R\) as shown at 910. The write/read line may be active low and may indicate the direction of the data transfer relative to the bus master. The write/read line may be driven by the bus master.

DSD bus 650 may further comprise a hold line as shown at 912. The hold line may be asserted by the disk controller 682 to request bus mastership. The hold line may be active low and may be provided by the NCR53C720 SCSI I/O processor 682.

DSD bus 650 may further comprise a hold acknowledge (HLDA\) line as shown at 914. The hold acknowledge line may be asserted by DSD bus arbitration logic 786 to indicate that the previous bus master has relinquished control of the DSD bus 650. The hold acknowledge line may be active low.

DSD bus 650 may further comprise a bus clock (BCLK) line as shown at 916. The bus clock signal may control the DMA portion of the NCR53C720 SCSI I/O processor 682. The bus clock may be provided by DSDC 636.

DSD bus 650 may further comprise a chip reset line as shown at 918. The chip reset line may be active low and may force a synchronous reset of the NCR53C720 SCSI I/O processor 682. In the exemplary embodiment, the chip reset line may be asserted by DSDC 636 for a minimum of 15 bus cycles.

DSD bus 650 may further comprise a chip select (CS\) line as shown at 920. The chip select line may select the NCR53C720 SCSI I/O processor 682 as a slave device. In the exemplary embodiment, the chip select line may be active low and may be connected to address bit 6 of the 30 bit address bus discussed above.

DSD bus 650 may further comprise an interrupt (IRQ\) line as shown at 922. The interrupt line may be active low and may indicate that service is required from USBC0 640 and/or USBC1 642.

Referring to FIG. 10B, DSD bus 650 may further comprise four byte enable (BE) lines as shown at 924, 926, 928, and 930. Each of the bus enable lines may be active low and each may be asserted by the bus master. A first byte enable line (BE0) may enable the transfer of data over data bus lines 24–31. A second byte enable line (BE1) may enable the transfer of data over data bus lines 16–23. A third byte enable line (BE2) may enable the transfer of data over data bus lines 8–15. Finally, a fourth byte enable line (BE3) may enable the transfer of data over data bus lines 0–7.

DSD bus 650 may further comprise a ready-in (READYI\) line as shown at 932. The ready-in line may be provided by the slave device to the master device indicating that the slave device is ready to transfer data to the master device. The ready-in line may be active low and may be provided by DSDC 636 even if DSDC 636 is not the master of the bus.

DSD bus 650 may further comprise a ready-out (READYO\) line as shown at 934. The ready-out line may be asserted to indicate the end of a slave cycle. In the exemplary embodiment, the ready-out line may be active low and may be provided by disk controller 682 to terminate a slave cycle.

DSD bus 650 may further comprise a master line as shown at 936. The master line may be asserted by the NCR53C720 I/O processor 682 to indicate it has become bus master. The master line may be active low.

DSD bus 650 may further comprise a bus mode select (BS) bus as shown at 938. The bus mode select bus may select the bus mode and addressing mode of the NCR53C720 I/O processor 682. In the exemplary embodiment, the bus mode select bus is set to "010" thereby selecting a 80386DX like bus mode (bus mode 4) and the big endian addressing mode.

Finally, DSD bus 650 may further comprise a scripts autostart mode (AUTO) line at shown at 940. The scripts autostart mode line selects either auto or manual scripts start mode. Script routines may be stored in memory 680 and may control a RISC processor in NCR53C720 SCSI I/O processor 682. When scripts autostart mode is set low, the execution of the scripts programs starts at address zero of a DSP register within NCR53C720 SCSI I/O processor 682, immediately following a chip reset. When scripts autostart mode is set high, the execution of the scripts programs starts at an address which corresponds to a value which is loaded into the DSP register by USBC0 640 and/or USBC1 642, immediately following a chip reset. In the exemplary embodiment, the scripts auto start mode line is set to one.

As indicated with reference to FIG. 8, a number of control signals may be provided between DSDC 636 and disk controller 682 via interface 651. These signals may include the signals shown at 906, 908, 910, 912, 914, 916, 918, 920, 922, 932, 934, 936, and 938. Similarly, a number of control signals may be provided between DSDC 636 and memory 680 via interface 653. These signals may include a memory read/write enable signal and the four byte enable signals shown at 924, 926, 928 and 930.

Figure 11:
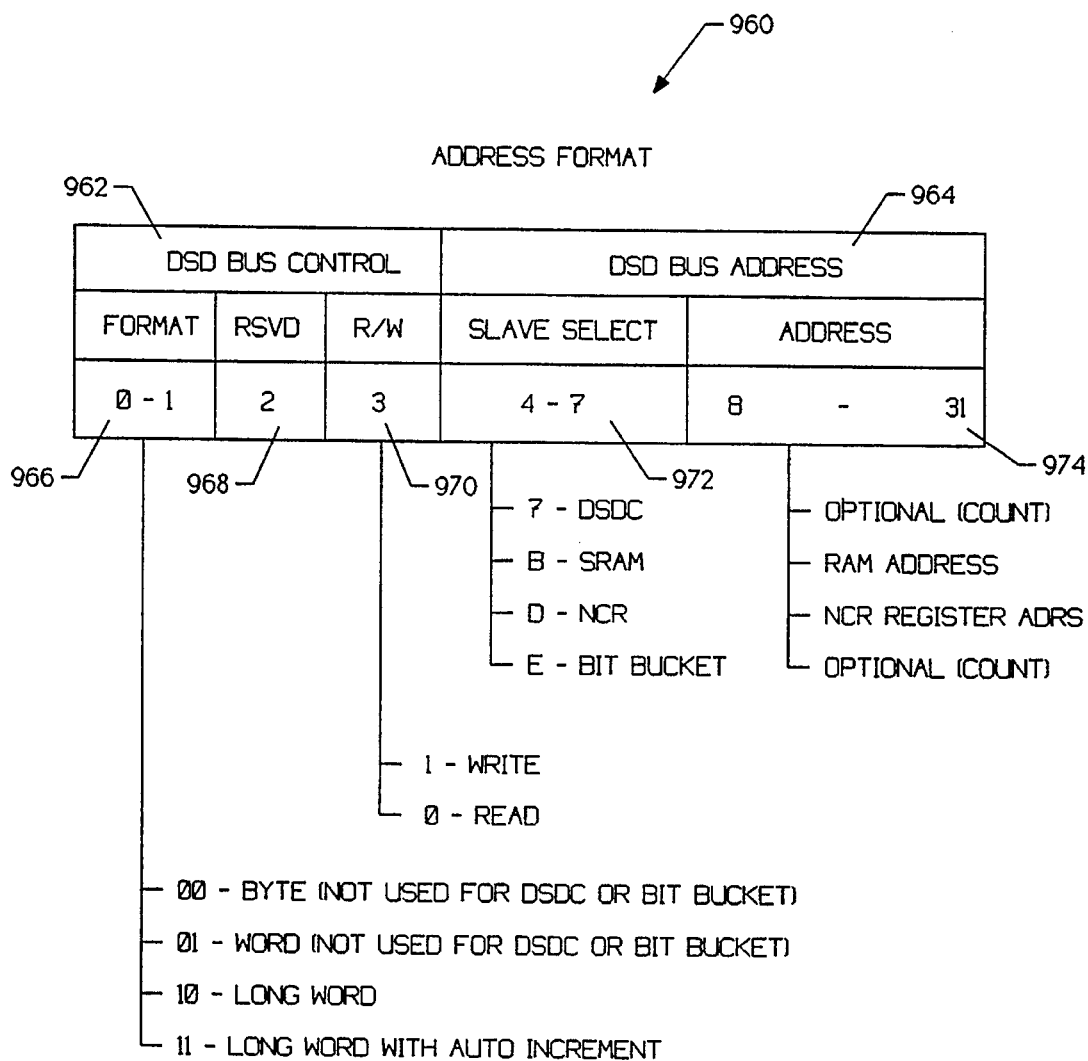
FIG. 11 is a table illustrating an exemplary address format for the address field of the DSD bus of FIG. 8.

FIG. 11 is a table illustrating an exemplary address format for the address field of the DSD bus of FIG. 8. The table is generally shown at 960. The address format of the address field of DSD bus 650 may comprise DSD bus control signals 962 and DSD bus address signals 964. The DSD bus control signals may comprise a format field 966, a reserved field 968, and a read/write field 970. The DSD address signals may comprise a slave select field 972 and an address field 974.

The format field 966 may specify the format of a corresponding address. For example, the format field may specify the format of a corresponding address as a long word or a long word with auto increment. The auto increment option is further discussed above with reference to FIG. 9A and FIG. 9B. The read/write field 970 may indicate whether the corresponding address is requesting a read or write operation.

The slave select field 972 may indicate which of the three devices attaches to DSD bus 650 is to be the slave. That is, if DSDC 636 has bus mastership and is providing the address, the slave select field may indicate whether NCR53C720 682 or memory 680 is to be the slave. Finally, the address field 974 provides a valid address to the selected slave device. That is, if memory 680 is the slave device, the address field 974 may provide a valid memory address thereto. Under some conditions, the address field is optional as shown. That is, when DSDC 636 is the slave device, the address field is optional. The slave select field identifier shown below slave select field 972 correspond to the address field identifiers shown below address field 974. Format bits 0 and 1, and address bits 30 and 31 may be decoded to provide the bi-directional byte enable signals 924, 926, 928, and 930 as shown in FIG. 10B.

Figure 12:
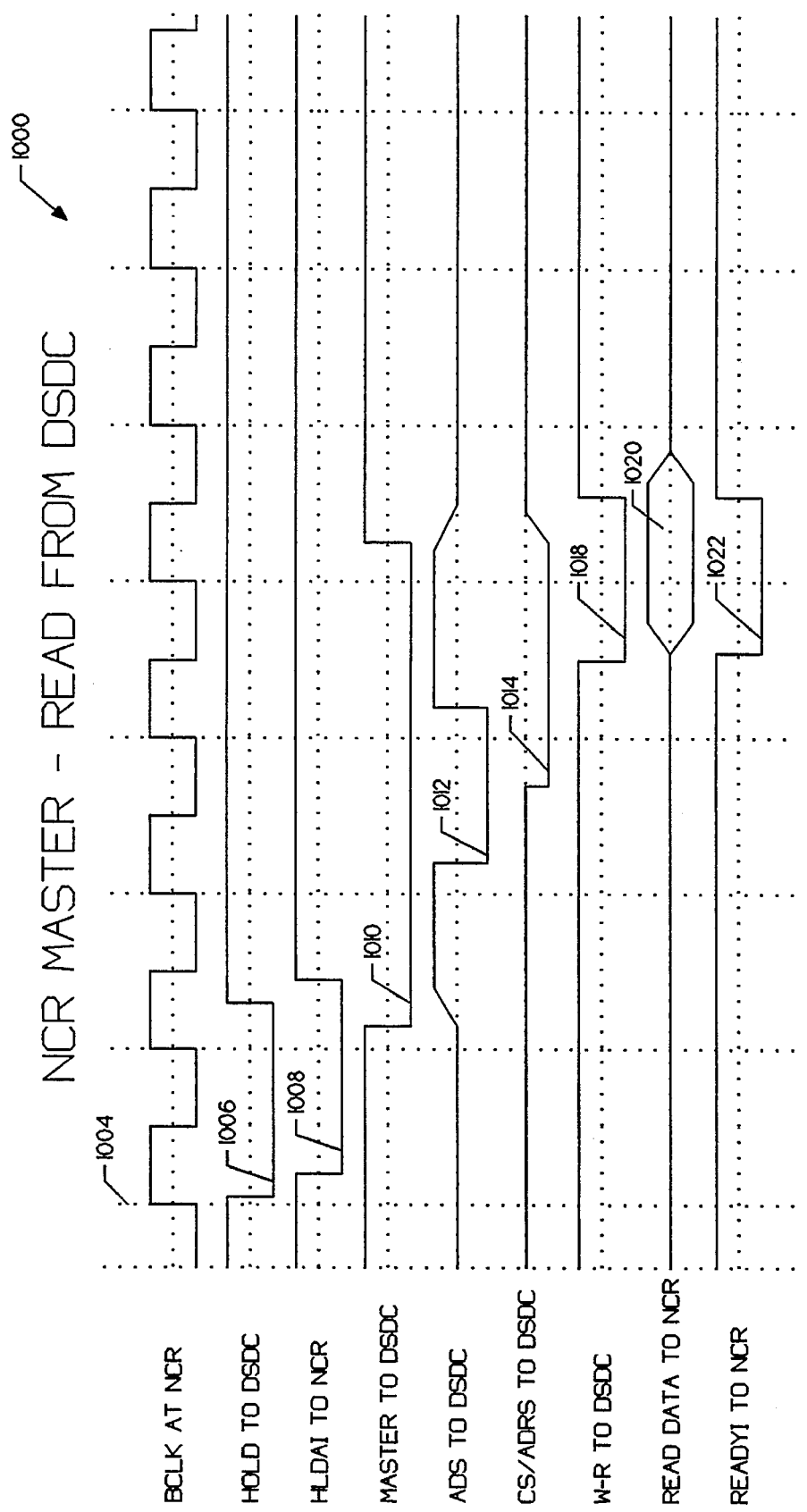
FIG. 12 is a timing diagram illustrating an exemplary read cycle on the DSD bus wherein the NCR chip is the master and the DSDC device is the slave.

FIG. 12 is a timing diagram illustrating an exemplary read cycle on the DSD bus wherein the NCR chip is the master and the DSDC device is the slave. The timing diagram is generally shown at 1000. In the exemplary embodiment, NCR53C720 682, memory 680, and DSDC 636 are coupled to the DSD bus 650. Tri-state transceivers are used by all three devices to interface with the bi-directional lines of the DSD bus 650. Data transfer cycles are initiated and terminated by whichever device is bus master at given time. The direction of data transfer (read/write) is relative to the bus master. Only one device can be bus master for a given data transfer cycle.

When one of the three devices is the bus master, one of the two remaining devices may be the bus slave, and is either the source (read) or destination (write) of the data transfer. The third device on DSD bus 650 is inactive. NCR53C720 682 and DSDC 636 may be either a bus master or a bus slave, while memory 680 may only be a bus slave. Arbitration logic 786 in DSDC 636 may determine which device will be the next bus master when the present bus master relinquishes control of DSD bus 650.

Referring specifically to NCR53C720 682, NCR53C720 682 arbitrate for bus mastership to fetch SCRIPTS instructions from memory 680 and to transfer data to/from the SCSI interface 554. After an instruction fetch or data transfer is complete, NCR53C720 682 may relinquish bus mastership. When executing block move instructions, NCR53C720 682 may relinquish bus mastership after transferring eight long words. However, if more data needs to be transferred, NCR53C720 682 may wait 5 to 8 clock cycles and then initiates arbitration to regain bus mastership to transfer up to 8 more long words. This process may continue until the block move instruction is complete. In the exemplary embodiment, the effective data transfer rate of a block move instruction to/from the SCSI disk(s) may be in excess of 20 MB/s.

Referring specifically to FIG. 12, wherein an exemplary read operation is shown with NCR53C720 682 as bus master and DSDC 636 is bus slave. The signal names provided along the left side of timing diagram 1000 generally correspond to the signals described with reference to FIGS. 10A and 10B.

At time 1004, NCR53C720 682 may assert a hold signal as shown at 1006, indicating to all of the devices coupled to DSD bus 650 that NCR53C720 682 is requesting bus mastership. Arbitration logic 786 within DSDC 636 may receive the hold signal 1006 and may assert a hold acknowledge signal in response thereto, as shown at 1008, indicating that the previous bus master has relinquished control of DSD bus 650. On the next bus clock cycle, NCR53C720 682 may assert a master signal to DSDC 636 as shown at 1010, indicating to DSDC 636 that NCR53C720 682 has become bus master of DSD bus 650. NCR53C720 682 may then assert an address status signal as shown at 1012. The address status signal indicates the start of a bus cycle. Shortly thereafter, and while the address status signal is still asserted, NCR53C720 682 may provide an address to DSDC 636 as shown at 1014. The select slave field of the address may select DSDC 636 to be the slave for this bus transaction.

NCR53C720 682 may then provide a read/write signal 1018 to DSDC 636. The read/write signal 1018 indicates that NCR53C720 682 is requesting to read data from DSDC 636. Finally, DSDC 636 may provide a ready-in 1022 signal to NCR53C720 682, indicating that DSDC 636 is ready to transfer data thereto. The read data on DSD bus 650 may then be provided as shown at 1020.

Figure 13:
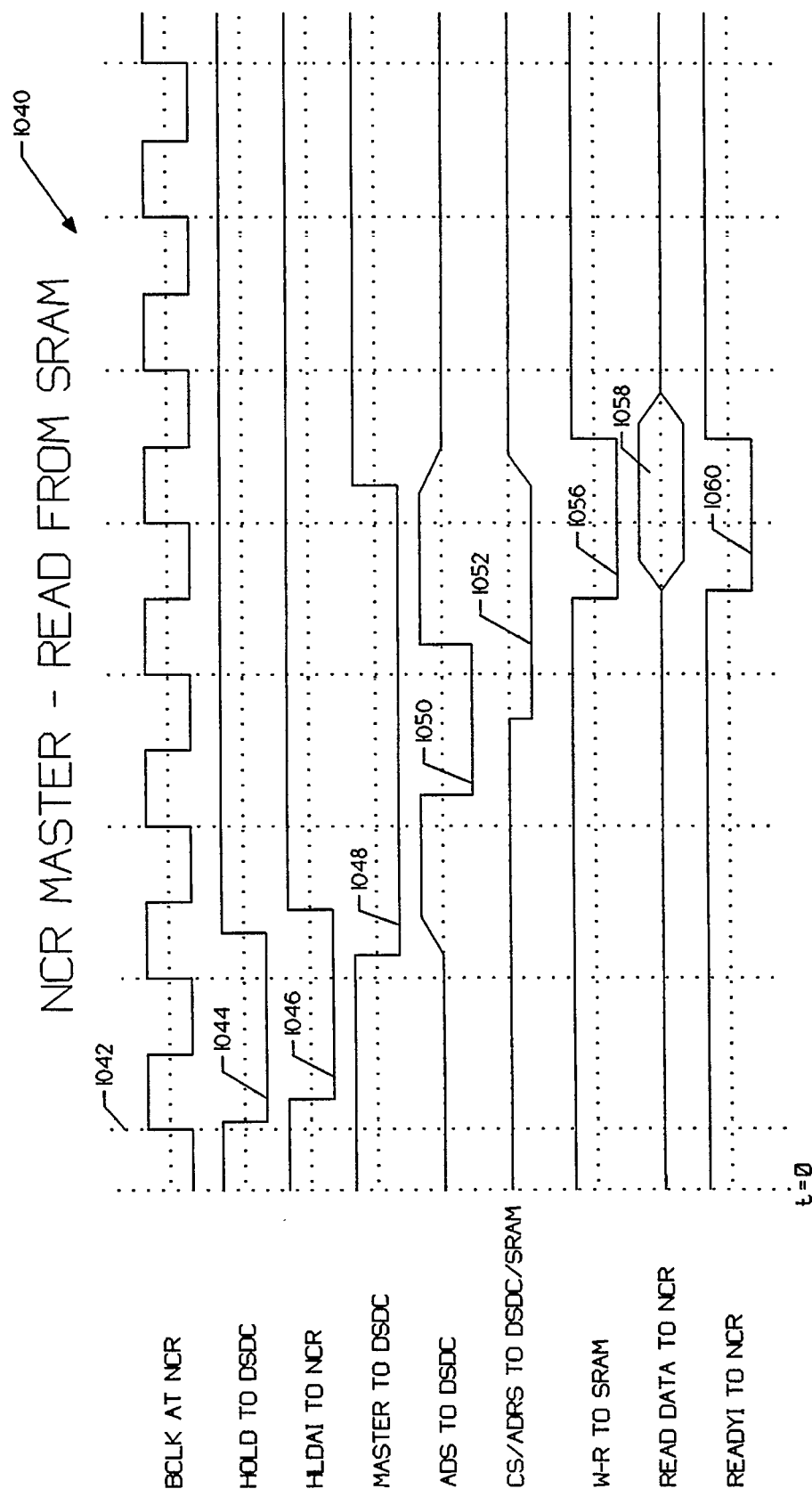
FIG. 13 is a timing diagram illustrating an exemplary read cycle on the DSD bus wherein the NCR chip is the master and the SRAM device is the slave.

FIG. 13 is a timing diagram illustrating an exemplary read cycle on the DSD bus wherein the NCR chip is the master and the SRAM device is the slave. The timing diagram is generally shown at 1040. The signal names provided along the left side of timing diagram 1040 generally correspond to the signals described with reference to FIGS. 10A and 10B.

At time 1042, NCR53C720 682 may assert a hold signal as shown at 1044, indicating to all of the devices coupled to DSD bus 650 that NCR53C720 682 is requesting bus mastership. Arbitration logic 786 within DSDC 636 may receive the hold signal 1044 and may assert a hold acknowledge signal in response thereto, as shown at 1046, indicating that the previous bus master has relinquished control of DSD bus 650. On the next bus clock cycle, NCR53C720 682 may assert a master signal to DSDC 636 as shown at 1048, indicating to DSDC 636 that NCR53C720 682 has become bus master of DSD bus 650. Note that it is not necessary to provide the master signal to memory 680 because memory 680 cannot be a bus master. NCR53C720 682 may then assert an address status signal as shown at 1050. The address status signal indicates the start of a bus cycle. Shortly thereafter, and while the address status signal is still asserted, NCR53C720 682 may provide an address to DSDC 636 and memory 680 as shown at 1052. The select slave field of the address may select memory 680 to be the slave for this bus transaction.

NCR53C720 682 may then provide a read/write signal 1056 to memory 680. The read/write signal 1056 indicates that NCR53C720 682 is requesting to read data from memory 680. Finally, memory 680 may provide a ready-in signal 1060 to NCR53C720 682, indicating that memory 680 is ready to transfer data thereto. The read data on DSD bus 650 is shown at 1058.

Figure 14:
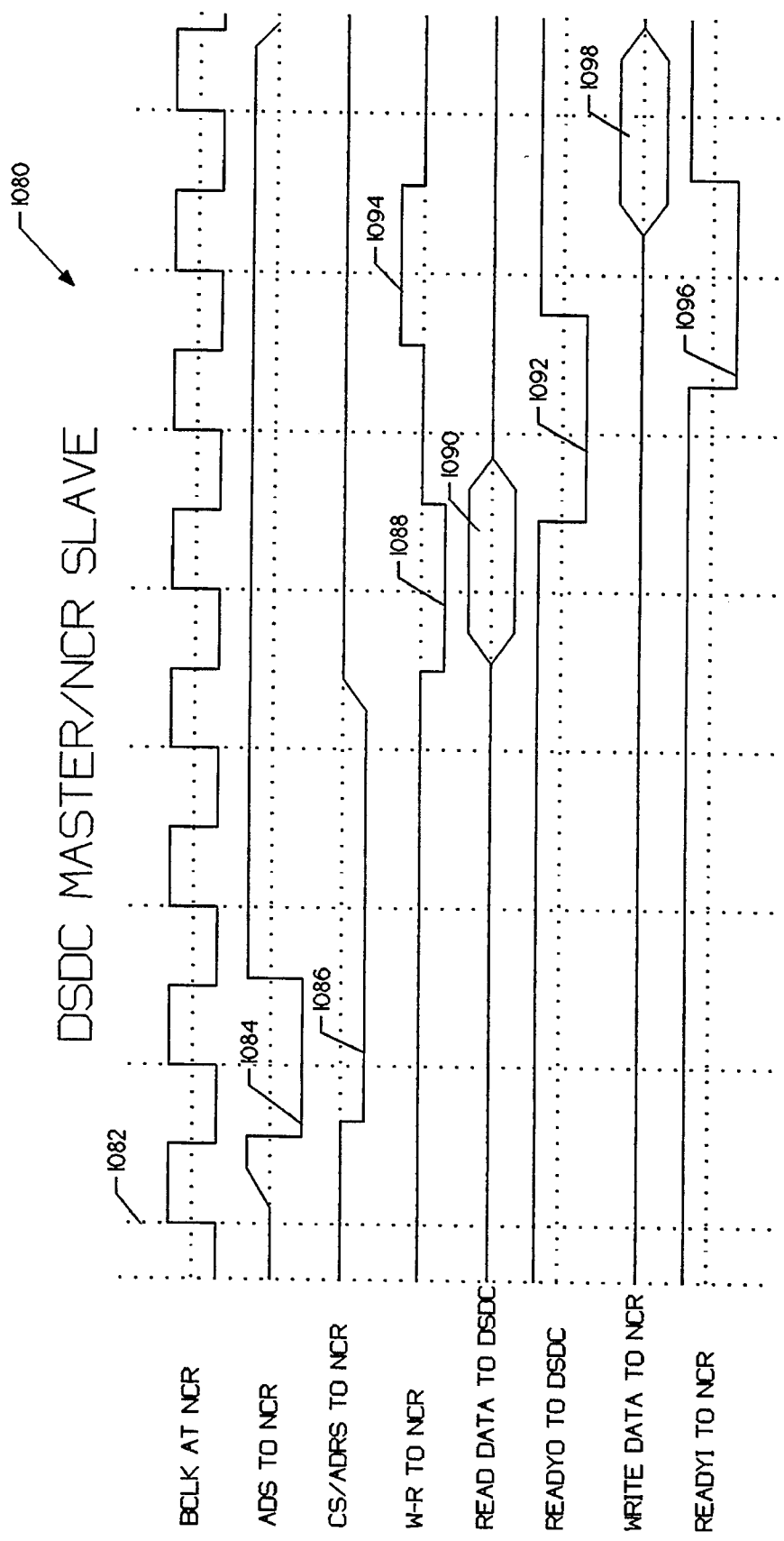
FIG. 14 is a timing diagram illustrating an exemplary read and write cycle on the DSD bus wherein the DSDC device is the master and the NCR chip is the slave.

FIG. 14 is a timing diagram illustrating an exemplary read and write cycle on the DSD bus wherein the DSDC device is the master and the NCR53C720 is the slave. The timing diagram is generally shown at 1080. At time 1082, DSDC 636 may assert an address status signal as shown at 1084. The address status signal indicates to NCR53C720 682 the start of a bus cycle. Shortly thereafter, and while the address status signal is still asserted, DSDC 636 may provide a chip select signal and an address to NCR53C720 682 and memory 680 as shown at 1086. The chip select signal selects the NCR53C720 682 as the slave device. The chip select signal may comprise the slave select field 972 of the DSD address 964.

DSDC 636 may then provide a read/write signal 1088 to NCR53C720 682. At 1088, DSDC 636 provides a low on the read/write signal indicating that DSDC 636 is requesting a read from NCR53C720 682. NCR53C720 682 may then provide the requested read data to DSDC 636 as shown at 1090. Thereafter, NCR53C720 682 may provide a ready-out signal 1092 to DSDC 636 to indicate the end of the slave bus cycle. DSDC 636 may then provide a read/write signal 1094 to NCR53C720 682. At 1094, DSDC 636 provides a high on the read/write signal indicating that DSDC 636 is requesting to write to NCR53C720 682. DSDC 636 may provide a ready-in signal 1096 to NCR53C720 682, indicating that DSDC 636 is ready to write data thereto. DSDC 636 may then provide the write data to NCR53C720 682 as shown at 1098.

Figure 15:
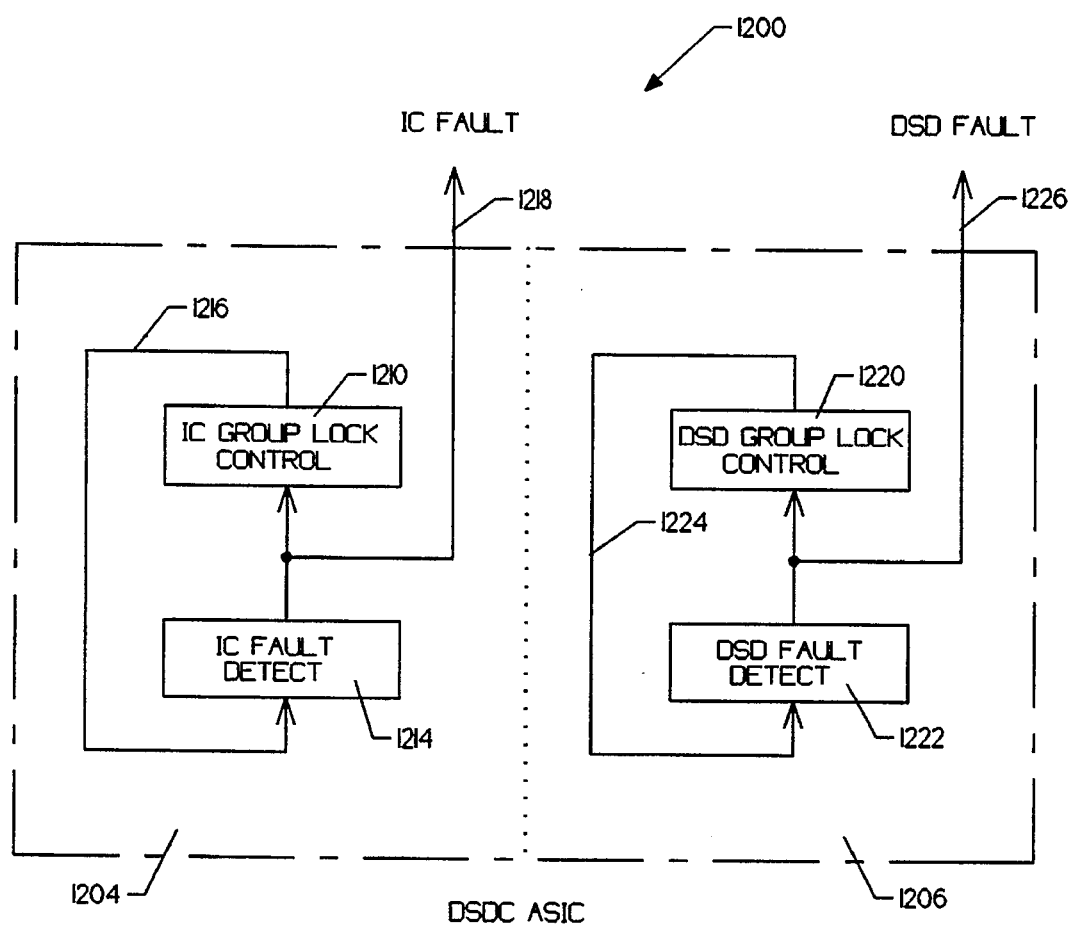
FIG. 15 is a block diagram of the DSDC device of the above described system utilizing an exemplary embodiment of the present invention.

FIG. 15 is a block diagram of the DSDC device of the above described system utilizing an exemplary embodiment of the present invention. The diagram is generally shown at 1200. FIG. 6 through FIG. 14 describe an exemplary system wherein data within a non-volatile memory may be downloaded to a disk drive system under battery power, when a primary power source fails. The system may have a host interface adapter 534 and a non-volatile memory 540. The host interface adapter 534 may comprise a data save disk controller (DSDC) application specific integrated circuit (ASIC) 636, a disk controller 682, and a number of disk drives 552. The host interface adapter 534 may provide an interface between a host main storage block 510 and non-volatile memory 540. The host interface adapter 534 may further provide an interface between the non-volatile memory 540 and the DSDC ASIC 636 wherein the DSDC ASIC 636 may download and/or upload the contents of the non-volatile memory 540 to/from the disk controller 682 and disk drives 552, when the primary power source fails.

In some smaller system configurations, the battery backup source may provide enough power to download all of the contents of the non-volatile memory 540 through an I/O processor 516 to a host disk storage system 520. In these systems, the data save disk (DSD) function may be redundant. In some larger system configurations, however, the data save disk function may be considered critical because the battery backup power source may not provide enough power to download all of the data elements of non-volatile memory 540 through I/O processor 516 and to the host disk storage system 520. That is, the battery backup power source may only provide enough power to download all of the data elements of non-volatile memory 540 through the DSDC ASIC 636 and to the number of disk drives 552.

The DSDC ASIC 636 may contain circuitry to support both host interface adapter 534 functions, including system access to non-volatile memory 540, and data save disk functions. In the smaller system configurations discussed above, the data save disk functions may be redundant. Therefore, in accordance with the present invention, the portion of the DSDC ASIC 636 which supports the HIA functions may be in a first fault group 1204 while the portion of the DSDC ASIC 636 which supports the data save disk function may be in a second fault group 1206. An error detected in the first fault group 1204 may be considered "critical" because system access to non-volatile memory 540 through the host interface adapter 534 may be affected. However, an error detected in the second fault group 1206 may be considered "passive" because the DSD function may be considered redundant and therefore the normal operation of the computer system may not be affected.

Each of the two groups 1204 and 1206 may have an error detection scheme provided therein. Further, each of the two groups 1204 and 1206 may have a number of scan paths provided therein to support BIST operations. The first group 1204 may provide an error signal to a support controller via interface 1218, when an error is detected therein. A group lock control block 1210 may freeze the contents of IC fault detect register 1214 via interface 1216, upon the detection of an error therein. The support controller (not shown) may then interrupt the normal operation of the computer system, down the corresponding host interface adapter, and analyze the error immediately. Further, the source of the error may be identified using BIST techniques, as described above. The second group 1206 may also provide an error signal to the support controller via interface 1226, when an error is detected therein. A group lock control block 1220 may freeze the contents of DSD fault detect register 1222 via interface 1224, upon the detection of an error therein. However, for errors in the second group 1206, the support controller may not interrupt the normal operation of the computer system, but rather may set a degrade bit on the host interface card 534 to indicate that the DSD function is no longer available. The host interface adapter card 534 may then be replaced at some future date with minimal system impact. As can readily be seen, the present invention may allow the normal operation of the computer system to continue despite the detection of an error within the second group 1206. This may increase the overall reliability and performance of the corresponding computer system.

Figure 16:
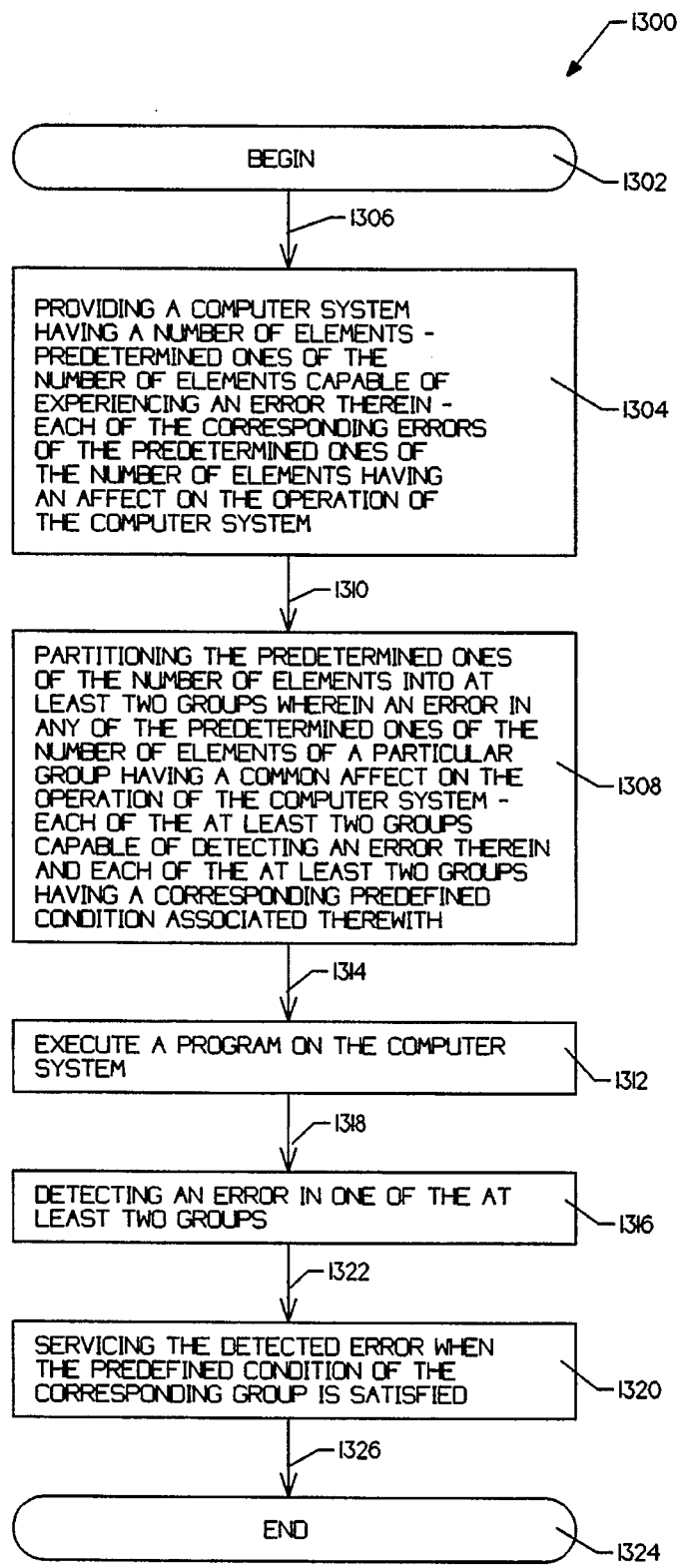
FIG. 16 is a flow diagram showing a first exemplary method of the present invention.

FIG. 16 is a flow diagram showing a first exemplary method of the present invention. The flow diagram is generally shown at 1300. The algorithm is entered at element 1302, wherein control is passed to element 1304 via interface 1306. Element 1304 provides a computer system having a number of elements, wherein predetermined ones of the number of elements are capable of experiencing an error therein. Each of the corresponding errors of the predetermined ones of the number of elements having an affect on the operation of the computer system. Control is then passed to element 1308 via interface 1310. Element 1308 partitions the predetermined ones of the number of elements into at least two groups wherein an error in any of the predetermined ones of the number of elements of a particular group have a common affect on the operation of the computer system. Each of the at least two groups being capable of detecting an error therein, and each of the at least two groups having a corresponding predefined condition associated therewith. Control is then passed to element 1312 via interface 1314. Element 1312 executes a program on the computer system. Control is then passed to element 1316 via interface 1318. Element 1316 detects an error in at least one of the at least two groups. Control is then passed to element 1320 via interface 1322. Element 1320 services the error detected in element 1316 when the predefined condition of the corresponding group is satisfied. Control is then passed to element 1324 via interface 1326, wherein the algorithm is exited.

Figure 17:
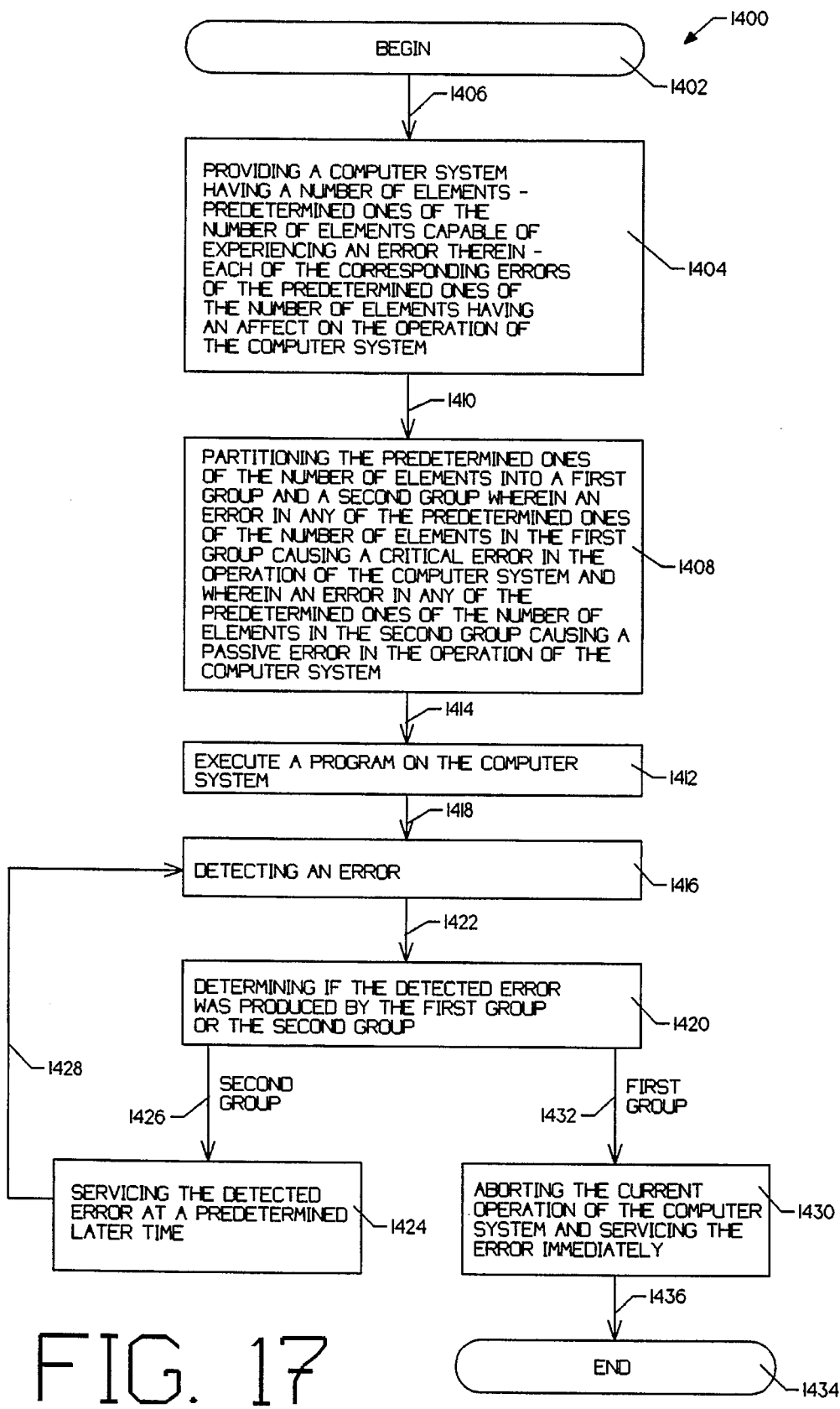
FIG. 17 is a flow diagram showing a second exemplary method of the present invention.

FIG. 17 is a flow diagram showing a second exemplary method of the present invention. The flow diagram is generally shown at 1400. The algorithm is entered at element 1402, wherein control is passed to element 1404 via interface 1406. Element 1404 provides a computer system which has a number of elements. Predetermined ones of the number of elements being capable of experiencing an error therein. Each of the corresponding errors of the predetermined ones of the number of elements having an affect on the operation of the computer system. Control is then passed to element 1408 via interface 1410. Element 1408 partitions the predetermined ones of the number of elements into a first group and a second group. An error in any of the predetermined ones of the number of elements in the first group may cause a critical error in the operation of the computer system. An error in any of the predetermined ones of the number of elements in the second group may cause a passive error in the operation of the computer system. Control is then passed to element 1412 via interface 1414. Element 1412 executes a program on the computer system. Control is then passed to element 1416 via interface 1418. Element 1416 detects an error. Control is then passed to element 1420 via interface 1422. Element 1420 determines if the error detected in element 1416 was produced by the first group or the second group. If the error detected in element 1416 was produced by the second group, control is passed to element 1424 via interface 1426. Element 1424 services the detected error at a predetermined later time. Control is then passed back to element 1416 via interface 1428. Referring back to element 1420, if the error detected in element 1416 was produced by the first group, control is passed to element 1430 via interface 1432. Element 1430 aborts the current operation of the computer system and services the error immediately. Control is then passed to element 1434 via interface 1436, wherein the algorithm is exited.

Having thus described the preferred embodiments of the present invention, those of skill in the art will readily appreciate that the teachings found herein may be applied to yet other embodiments within the scope of the claims hereto attached.

We claim:

1. In an electrical apparatus having a plurality of hardware elements and a number of error detection circuits, the number of error detection circuits being coupled to predetermined ones of the plurality of hardware elements, each of the number of error detection circuits continuously monitoring a corresponding one of the predetermined ones of the plurality of hardware elements and providing a corresponding error bit whenever an error is detected thereby, each of the corresponding error bits being serviced by a support controller, the improvement of the electrical apparatus comprising:

a. receiving means coupled to at least one of the number of error detection circuits for receiving a corresponding error bit from each of said at least one of the number of error detection circuits; and b. determining means coupled to said receiving means for determining which of the corresponding error bits provided by said at least one of the number of error detection circuits are to be serviced immediately by the support controller, and which of the corresponding error bits provided by said at least one of the number of error detection circuits are to be serviced at a predetermined time later by the support controller.

2. An electrical apparatus according to claim 1 wherein a first subset of the number of error detection circuits are associated with a first group and a second subset of the number of error detection circuits are associated with a second group, said determining means allowing each of the number of error detection circuits associated with said first group to be serviced by the support controller at a first predetermined time, and said determining means allowing each of the number of error detection circuits associated with said second group to be serviced by the support controller at a second predetermined time.

3. An electrical apparatus according to claim 2 wherein said receiving means comprises a number of error detection registers.

4. A data processing system for executing a number of sequential instructions including a current instruction, comprising:

a. a first group of hardware elements and a second group of hardware elements wherein said first group of hardware elements further includes a first error detecting means and said second group of hardware elements further includes a second error detection means, said first error detection means continuously monitoring preselected ones of said first group of hardware elements and detecting a number of predefined errors in the preselected ones of said first group of hardware elements, and said second error detecting means continuously monitoring predefined ones of said second group of hardware elements and detecting a number of predefined errors in the preselected ones of said second group of hardware elements; and b. servicing means coupled to said first group of hardware element and to said second group of hardware elements for servicing said number of predefined errors detected by said first error detecting means and said number of predefined errors detected by said second error detecting means, said servicing means servicing said predefined errors detected in said first group of hardware elements before servicing said predefined errors detected in said second group of hardware elements.

5. A data processing system according to claim 4 wherein said servicing means services said predefined errors detected in said first group of hardware elements immediately and services said predefined errors detected in said second group of hardware elements at a predetermined time later.

6. A data processing system according to claim 5 wherein said servicing means further includes interrupting means, wherein said interrupting means interrupts the execution of the data processing system before said servicing means services said predefined errors detected in said first group of hardware elements.

7. A data processing system according to claim 6 wherein said servicing means further includes determining means for determining when the execution of the current instruction is complete, and control means coupled to said determining means for controlling when said servicing means services said predefined errors detected in said second group of hardware elements, said control means prompting said servicing means to service said predefined errors detected in said second group of hardware elements after the execution of the current instruction is completed.

8. A data processing system according to claim 6 wherein a utilization factor is defined by the number of sequential instructions executed by the data processing system per unit time, said servicing means further including control means wherein said control means prompts said servicing means to service said predefined errors detected in said second group of hardware elements after said utilization factor of the data processing system drops below a predetermined level.

9. A data processing system according to claim 6 wherein said servicing means further includes determining means for determining when the data processing system is rebooted, and control means coupled to said determining means for controlling when said servicing means services said predefined errors detected in said second group of hardware elements, said control means prompting said servicing means to service said predefined errors detected in said second group of hardware elements during the next reboot of the data processing system.

10. A data processing system according to claim 6 wherein said servicing means further includes means for notifying a service technician of said predefined errors detected in said second group of hardware elements for a next preventive maintenance session.

11. A data processing system according to claim 5 wherein said predefined errors detected in said first group of hardware elements are critical errors.

12. A data processing system according to claim 5 wherein said predefined errors detected in said second group of hardware elements are passive errors.

13. A data processing system for executing a number of sequential instructions including a current instruction, comprising:

a. a support controller;

b. a first group of hardware element;

c. a number of first error detecting means coupled to preselected ones of said first group of hardware elements, said number of first error detecting means for continuously monitoring the preselected ones of said first group of hardware elements and detecting a number of corresponding first errors in said preselected ones of said first group of hardware elements;

d. first error storage means coupled to said number of first error detecting means for storing said number of corresponding first errors;

e. first disabling means coupled to said first error storage means for disabling said first error storage means once a first one of said number of corresponding first errors is detected;

f. first providing means coupled to said first error storage means and further coupled to said support controller for providing a first fault type to said support controller when said first one of said number of corresponding first errors is detected;

g. a second group of hardware elements;

h. a number of second error detecting means coupled to preselected ones of said second group of hardware elements, said number of second error detecting means for continuously monitoring the preselected ones of said second group of hardware elements and detecting a number of corresponding second errors in said preselected ones of said second group of hardware elements;

i. second error storage means coupled to said number of second error detecting means for storing said number of corresponding second errors;

j. second disabling means coupled to said second error storage means for disabling said second error storage means once a first one of said number of corresponding second errors is detected;

k. second providing means coupled to said second error storage means and further coupled to said support controller for providing a second fault type to said support controller when the first one of said number of corresponding second errors is detected; and l. servicing means coupled to said support controller wherein said servicing means services said first fault type before servicing said second fault type.

14. A data processing system according to claim 13 wherein said servicing means further includes means for prioritizing said first fault type and said second fault type such that said servicing means services said first fault type immediately and services said second fault type at a predetermined time later.

15. A data processing system according to claim 14 wherein said servicing means further includes interrupting means, said interrupting means interrupts the execution of the data processing system before said servicing means services said first fault type.

16. A data processing system according to claim 14 wherein said servicing means further includes determining means for determining when the execution of the current instruction is complete, and control means coupled to said determining means for controlling when said servicing means services said second fault type, said control means prompting said servicing means to service said second fault type after the execution of the current instruction is completed.

17. A data processing system according to claim 14 wherein a utilization factor is defined by the number of sequential instructions executed by the data processing system per unit time, said servicing means further includes control means for controlling when said servicing means services said second fault type, said control means prompting said servicing means to service said second fault type after said utilization factor of the data processing system drops below a predetermined level.

18. A data processing system according to claim 14 wherein said servicing means further includes determining means for determining when the data processing is rebooted, and control means coupled to said determining means for controlling when said servicing means services said second fault type, said control means prompting said servicing means to service said second fault type during the next reboot of the data processing system.

19. A data processing system according to claim 14 wherein said servicing means further includes means for notifying a service technician of said second fault type for a next preventive maintenance session.

20. A data processing system according to claim 13 wherein said first fault type corresponds to a critical error.

21. A data processing system according to claim 20 wherein said second fault type corresponds to a passive error.

22. A data processing system according to claim 21 wherein each of said number of first error detecting means comprise a parity checking circuit.

23. A data processing system according to claim 22 wherein each of said number of second error detecting means comprise a parity checking circuit.

24. In an electrical apparatus having a plurality of hardware elements and a number of error detection circuits, the number of error detection circuits being coupled to predetermined ones of the plurality of hardware elements, each of the number of error detection circuits continuously monitoring a corresponding one of the predetermined ones of the plurality of hardware elements and providing a corresponding error bit whenever an error is detected thereby, each of the corresponding error bits being serviced by a support controller, the improvement of the electrical apparatus comprising:

a. a receiving circuit coupled to at least one of the number of error detection circuits for receiving a corresponding error bit from each of said at least one of the number of error detection circuits; and b. determining circuit coupled to said receiving circuit for determining which of the corresponding error bits provided by said at least one of the number of error detection circuits are to be serviced immediately by the support controller, and which of the corresponding error bits provided by said at least one of the number of error detection circuits are to be serviced at a predetermined time later by the support controller.

25. An electrical apparatus according to claim 24 wherein a first subset of the number of error detection circuits are associated with a first group and a second subset of the number of error detection circuits are associated with a second group, said determining circuit allowing each of the number of error detection circuits associated with said first group to be serviced by the support controller at a first predetermined time, and said determining circuit allowing each of the number of error detection circuits associated with said second group to be serviced by the support controller as a second predetermined time.

26. An electrical apparatus according to claim 25 wherein said receiving circuit comprises a number of error detection registers.

27. A data processing system for executing a number of sequential instructions including a current instruction, comprising:

a. a first group of hardware elements and a second group of hardware elements wherein said first group of hardware elements further includes a first error detecting circuit and said second group of hardware elements further includes a second error detection circuit, said first error detection circuit continuously monitoring preselected ones of said first group of hardware elements and detecting a number of predefined errors in the preselected ones of said first group of hardware elements each of said, and said second error detecting circuit continuously monitoring preselected ones of said second group of hardware elements and detecting a number of predefined errors in the preselected ones of said second group of hardware elements; and b. a servicing circuit coupled to said first group of hardware element and to said second group of hardware elements for servicing said number of predefined errors detected by said first error detecting circuit and said number of predefined errors detected by said second error detecting circuit, said servicing circuit servicing said predefined errors detected in said first group of hardware elements before servicing said predefined errors detected in said second group of hardware elements.

28. A data processing system according to claim 27 wherein said servicing circuit services said predefined errors detected in said first group of hardware elements immediately and services said predefined errors detected in said second group of hardware elements at a predetermined time later.

29. A data processing system according to claim 28 wherein said servicing circuit further includes an interrupting circuit, wherein said interrupting circuit interrupts the execution of the data processing system before said servicing means services said predefined errors detected in said first group of hardware elements.

30. A data processing system according to claim 29 wherein said servicing circuit further includes a determining circuit for determining when the execution of the current instruction is complete, and a control circuit coupled to said determining circuit for controlling when said servicing circuit services said predefined errors detected in said second group of hardware elements, said control circuit prompting said servicing circuit to service said predefined errors detected in said second group of hardware elements after the execution of the current instruction is completed.

31. A data processing system according to claim 29 wherein a utilization factor is defined by the number of sequential instructions executed by the data processing system per unit time, said servicing circuit further including a control circuit wherein said control circuit prompts said servicing circuit to service said predefined errors detected in said second group of hardware elements after said utilization factor of the data processing system drops below a predetermined level.

32. A data processing system according to claim 29 wherein said servicing circuit further includes a determining circuit for determining when the data processing system is rebooted, and a control circuit coupled to said determining circuit for controlling when said servicing circuit services said predefined errors detected in said second group of hardware elements, said control circuit prompting said servicing circuit to service said predefined errors detected in said second group of hardware elements during the next reboot of the data processing system.

33. A data processing system according to claim 29 wherein said servicing circuit further includes a notifying circuit for notifying a service technician of said predefined errors detected in said second group of hardware elements for a next preventive maintenance session.

34. A data processing system according to claim 28 wherein said predefined errors detected in said first group of hardware elements are critical errors.

35. A data processing system according to claim 28 wherein said predefined errors detected in said second group of hardware elements are passive errors.

36. A data processing system for executing a number of sequential instructions including a current instruction, comprising:
   a. a support controller;
   b. a first group of hardware elements;
   c. a number of first error detecting circuits coupled to preselected ones of said first group of hardware elements, said number of first error detecting circuits for continuously monitoring a corresponding one of the preselected ones of said first group of hardware elements and detecting a number of corresponding first errors in said preselected ones of said first group of hardware elements;
   d. a first error storage circuit coupled to said number of first error detecting circuits for storing said number of corresponding first errors;
   e. a first disabling circuit coupled to said first error storage circuit for disabling said first error storage circuit once a first one of said number of corresponding first errors is detected;
   f. a first providing circuit coupled to said first error storage circuit and further coupled to said support controller for providing a first fault type to said support controller when said first one of said number of corresponding first errors is detected;
   g. a second group of hardware elements;
   h. a number of second error detecting circuits coupled to preselected ones of said second group of hardware elements, said number of second error detecting circuits for continuously monitoring a corresponding one of the preselected ones of said second group of hardware elements and detecting a number of corresponding second errors in said preselected ones of said second group of hardware elements;
   i. a second error storage circuit coupled to said number of second error detecting circuit for storing said number of corresponding second errors;
   j. a second disabling circuit coupled to said second error storage circuit for disabling said second error storage circuit once a first one of said number of corresponding second errors is detected;
   k. a second providing circuit coupled to said second error storage circuit and further coupled to said support controller for providing a second fault type to said support controller when the first one of said number of corresponding second errors is detected; and
   l. a servicing circuit coupled to said support controller wherein said servicing circuit services said first fault type before servicing said second fault type.

37. A data processing system according to claim 36 wherein said servicing circuit further includes a control circuit wherein said control circuit ensures that said servicing circuit services said first fault immediately and services said second fault type at a predetermined time later.

38. A data processing system according to claim 37 wherein said servicing circuit further includes an interrupting circuit, said interrupting circuit interrupts the execution of the data processing system before said servicing circuit services said first fault type.

39. A data processing system according to claim 38 wherein said servicing circuit further includes a determining circuit for determining when the execution of the current instruction is complete, and a control circuit coupled to said determining circuit for controlling when said servicing circuit services said second fault type, said control circuit prompting said servicing circuit to service said second fault type after the execution of the current instruction is completed.

40. A data processing system according to claim 38 wherein a utilization factor is defined by the number of sequential instructions executed by the data processing system per unit time, said servicing circuit further includes a control circuit for controlling when said servicing circuit services said second fault type, said control circuit prompting said servicing circuit to service said second fault type after said utilization factor of the data processing system drops below a predetermined level.

41. A data processing system according to claim 38 wherein said servicing circuit further includes a determining circuit for determining when the data processing is rebooted, and a control circuit coupled to said determining circuit for controlling when said servicing circuit services said second fault type, said control circuit prompting said servicing circuit to service said second fault type during the next reboot of the data processing system.

42. A data processing system according to claim 38 wherein said servicing circuit further includes a notifying circuit for notifying a service technician of said second fault type for a next preventive maintenance session.

43. A data processing system according to claim 36 wherein said first fault type correspond to a critical error.

44. A data processing system according to claim 43 wherein said second fault type corresponds to a passive error.

45. A data processing system according to claim 44 wherein each of said number of first error detecting circuits comprise a parity checking circuit.

46. A data processing system according to claim 45 wherein each of said number of second error detecting circuits comprise a parity checking circuit.

47. A method for servicing errors within a computer system, the computer system having a number of hardware elements therein, each of the number of hardware elements capable of experiencing an error, and each of the errors having a predefined effect on the operation of the computer system, the number of hardware elements being partitioned into at least two groups wherein an error detected in any of the number of hardware elements of a particular one of the at least two groups having the same predefined effect on the operation of the computer system, the method comprising the steps of:

a. providing an error detecting means for each of said at least two groups for continuously monitoring the number of hardware elements in said corresponding one of said at least two groups and detecting errors in said corresponding one of said at least two groups;

b. providing a predefined condition for each of said at least two groups;

c. executing a program on the computer system;

d. detecting an error in at least one of said at least two groups via said error detecting means of step (a);

e. determining what group produced the detected error; and f. servicing the detected error when said predefined condition of said corresponding group is satisfied.

48. A method for servicing errors within a computer system, the computer system having a number of hardware elements therein, each of the number of hardware elements capable of experiencing an error, and each of the errors having a predefined effect on the operation of the computer system, the number of hardware elements being partitioned into a first group of hardware elements and a second group of hardware elements wherein an error in any of the number of hardware elements of the first group of hardware elements causes a critical error in the operation of the computer system and an error in any of the number of hardware elements of the second group of hardware elements causes a passive error in the operation of the computer system, the method comprising the steps of:

a. executing a program on the computer system;

b. detecting an error;

c. determining if the detected error was produced by the first group of hardware elements or by the second group of hardware elements;

d. aborting the operation of the computer system and servicing the detected error if said determining step (c) determined that the detected error was produced by the first group of hardware elements; and e. servicing the detected error a predetermined time later if said determining step (c) determined that the detected error was produced by said second group of hardware elements.

* * * * *

UNITED STATES PATENT AND TRADEMARK OFFICE
CERTIFICATE OF CORRECTION

PATENT NO.   : 5,596,716
DATED        : January 21, 1997
INVENTOR(S)  : Byers et al.

It is certified that error appears in the above-identified patent and that said Letters Patent is hereby corrected as shown below:

Col. 34, line 22, change "element" to --elements--.

Col. 36, line 35, delete "each of said".

Col. 36, line 41, change "element" to --elements--.

Signed and Sealed this

Twenty-fourth Day of June, 1997

Attest:

BRUCE LEHMAN

*Attesting Officer*         *Commissioner of Patents and Trademarks*